(12) United States Patent  
Shi et al.

(10) Patent No.: US 11,216,116 B2  
(45) Date of Patent: Jan. 4, 2022

(54) CONTROL METHOD AND TERMINAL

(71) Applicant: HUAWEI TECHNOLOGIES CO., LTD., Guangdong (CN)

(72) Inventors: Yuanchun Shi, Beijing (CN); Chun Yu, Beijing (CN); Lihang Pan, Beijing (CN); Xin Yi, Beijing (CN); Weigang Cai, Shanghai (CN); Siju Wu, Shenzhen (CN); Xuan Zhou, Shenzhen (CN); Jie Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 16/755,343

(22) PCT Filed: Oct. 15, 2018

(86) PCT No.: PCT/CN2018/110185  
§ 371 (c)(1),  
(2) Date: Apr. 10, 2020

(87) PCT Pub. No.: WO2019/072254  
PCT Pub. Date: Apr. 18, 2019

(65) Prior Publication Data  
US 2020/0301560 A1 Sep. 24, 2020

(30) Foreign Application Priority Data

Oct. 13, 2017 (CN) .......................... 201710954095.4  
Jan. 15, 2018 (CN) .......................... 201810037036.5

(51) Int. Cl.  
*G06F 3/041* (2006.01)  
*G06F 3/044* (2006.01)

(52) U.S. Cl.  
CPC .......... *G06F 3/04186* (2019.05); *G06F 3/044* (2013.01)

(58) Field of Classification Search  
CPC .............................. G06F 3/043; G06F 3/044  
(Continued)

(56) References Cited

U.S. PATENT DOCUMENTS 10,944,945 B2 * 3/2021 Nakamura ............. G09G 3/025  
2011/0063214 A1 * 3/2011 Knapp .................... H04L 12/43  
345/158

(Continued)

FOREIGN PATENT DOCUMENTS

CN 101930319 A 12/2010  
CN 103970322 A 8/2014  
(Continued)

*Primary Examiner* — Calvin C Ma

(57) ABSTRACT

A control method is provided, including: obtaining input information, where the input information includes a capacitance signal and report point coordinates generated when a user performs an operation on a terminal screen; using report point coordinates in a previous frame as report point coordinates in a current frame if it is determined that a capacitance signal in the current frame and a capacitance signal in the previous frame that are in the input information meet a preset condition; or using report point coordinates in a previous frame as report point coordinates in a current frame if it is determined that the report point coordinates in the current frame and report point coordinates in a first frame that are in the input information meet a preset condition.

18 Claims, 12 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2014/0139495 | A1 | 5/2014 | Liu |
| 2016/0195998 | A1 | 7/2016 | Bai et al. |
| 2017/0090617 | A1 | 3/2017 | Jang et al. |
| 2017/0357374 | A1* | 12/2017 | Li ......................... G06F 3/0488 |
| 2018/0335921 | A1* | 11/2018 | Karunamuni ....... G06F 3/04845 |

FOREIGN PATENT DOCUMENTS

| | | |
|---|---|---|
| CN | 104834165 A | 8/2015 |
| CN | 105117020 A | 12/2015 |
| CN | 105511776 A | 4/2016 |
| CN | 106354333 A | 1/2017 |
| CN | 106557215 A | 4/2017 |
| WO | 2014026568 A1 | 2/2014 |
| WO | 2016119650 A1 | 8/2016 |

\* cited by examiner

| 133 | 435 | 1148 | 1247 | 1694 | 1835 | 593 |
|---|---|---|---|---|---|---|
| 748 | 1948 | 2846 | 2694 | 2830 | 1631 | 309 |
| 946 | 2051 | 2461 | 3714 | 2948 | 735 | 281 |
| 683 | 1749 | 2120 | 2746 | 2519 | 845 | 194 |
| 1472 | 1936 | 1349 | 847 | 745 | 583 | 191 |
| 349 | 418 | 530 | 381 | 433 | 392 | 134 |

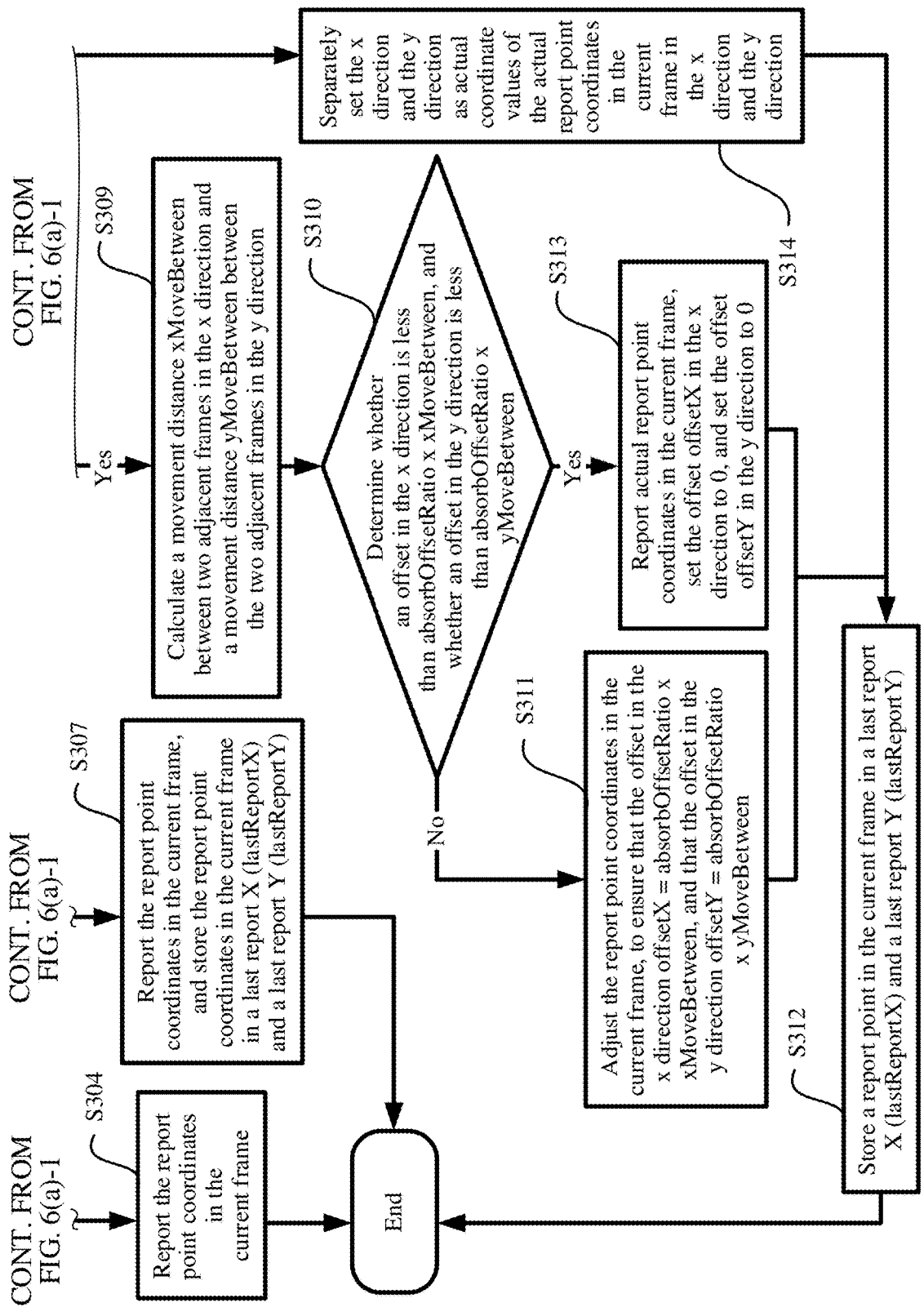

1

CONTROL METHOD AND TERMINAL

CROSS-REFERENCE TO RELATED APPLICATIONS

This application is a national stage of International Patent Application No. PCT/CN2018/110185, filed on Oct. 15, 2018, which claims priority to Chinese Patent Application No. 201810037036.5, filed on Jan. 15, 2018, and Chinese Patent Application No. 201710954095.4, filed on Oct. 13, 2017. All of the aforementioned applications are hereby incorporated by reference in their entireties.

TECHNICAL FIELD

Example embodiments of the present invention relate to the field of terminals, and in particular, to a control method and a terminal.

BACKGROUND

In recent years, a touchscreen panel (TP) is widely used due to advantages such as high sensitivity and a high response speed, and in particular, brings good user experience to a user in a field of intelligent terminals, such as a mobile phone. However, when the user unintentionally taps a screen with a finger, because of a change of a contact area between the finger and the screen, a terminal may perform a calculation and determine the unintentional tapping as a flick operation of the user. Consequently, user experience is affected.

SUMMARY

Example embodiments of the present invention provide a control method and a terminal, so that a user operation behavior is determined by using a capacitance signal on a terminal touchscreen and report point data on the touchscreen, and a problem that a user unintentionally triggers flicking is resolved.

According to a first aspect, a control method is provided, and the control method may include:

obtaining input information, where the input information includes a capacitance signal and report point coordinates that are generated when a user performs an operation on a terminal screen; and using report point coordinates in a previous frame as report point coordinates in a current frame if it is determined that a capacitance signal in the current frame and a capacitance signal in the previous frame that are in the input information meet a preset condition; or using report point coordinates in a previous frame as report point coordinates in a current frame if it is determined that the report point coordinates in the current frame and the report point coordinates in the previous frame that are in the input information meet a preset condition, to suppress flicking caused by an unintentional operation of the user.

In a possible implementation, the capacitance signal includes a strength value of a capacitance bright spot, the strength value of the capacitance bright spot is data corresponding to each element in the capacitance bright spot, each element is corresponding to a rectangular area at a corresponding position on the terminal screen, and the using report point coordinates in a previous frame as report point coordinates in a current frame if it is determined that a capacitance signal in the current frame and a capacitance signal in the previous frame that are in the input information meet a preset condition includes:

if it is determined that one or more of a peak ratio, a maximum value in sums of strength values of the capacitance bright spot, and a maximum value of the capacitance bright spot meets/meet a preset condition, using the report point coordinates in the previous frame as the report point coordinates in the current frame; or if it is determined that a peak ratio, a maximum value in sums of strength values of the capacitance bright spot, a maximum value of the capacitance bright spot, and a report point status meet a preset condition, using the report point coordinates in the previous frame as the report point coordinates in the current frame.

The maximum value of the capacitance bright spot is a maximum value in strength values corresponding to a plurality of elements in the capacitance bright spot. The peak ratio is a ratio of a maximum value of a capacitance bright spot in the current frame to a maximum value of a capacitance bright spot in the previous frame. The maximum value in the sums of the strength values of the capacitance bright spot is a maximum value in sums of data that is of four adjacent elements and that includes the maximum value in the strength values of the capacitance bright spot.

Optionally, in a possible implementation, when each of the one or more of the peak ratio, the maximum value in the sums of the strength values of the capacitance bright spot, and the maximum value of the capacitance bright spot is less than a preset threshold, or when all of the peak ratio, the maximum value in the sums of the strength values of the capacitance bright spot, and the maximum value of the capacitance bright spot are less than corresponding preset thresholds, and a report point is in a tapped state, the report point coordinates in the previous frame are used as the report point coordinates in the current frame.

Optionally, in another possible implementation, the capacitance signal further includes a major axis value and a minor axis value of a capacitance bright spot, and the using report point coordinates in a previous frame as report point coordinates in a current frame if it is determined that a capacitance signal in the current frame and a capacitance signal in the previous frame that are in the input information meet a preset condition includes:

if it is determined that displacement from the report point coordinates in the previous frame to the report point coordinates in the current frame, and the major axis value and the minor axis value of the capacitance bright spot meet a preset condition, using the report point coordinates in the previous frame as the report point coordinates in the current frame.

Optionally, in a possible implementation, when the displacement from the report point coordinates in the previous frame to the report point coordinates in the current frame is greater than a preset threshold $dist_i^0$, and an axis change value is greater than the preset threshold $dist_i^0$, the report point coordinates in the previous frame are used as the report point coordinates in the current frame.

i represents the current frame, i is a positive integer greater than 1, and the axis change value meets the following formula:

$$\text{Axis change value} = \sqrt{\begin{array}{l}(\text{Major axis value in a current frame} - \\ \text{Major axis value in a previous frame})^2 + \\ (\text{Minor axis value in the current frame} - \\ \text{Minor axis value in the previous frame})^2\end{array}}.$$

Optionally, in still another possible implementation, the using report point coordinates in a previous frame as report point coordinates in a current frame if it is determined that the report point coordinates in the current frame and report point coordinates in a first frame that are in the input information meet a preset condition includes:

if it is determined that a flicking distance between the report point coordinates in the previous frame and the report point coordinates in the current frame meets the preset condition, using the report point coordinates in the previous frame as the report point coordinates in the current frame.

The flicking distance is obtained by subtracting an unintentional flicking distance from a distance between the report point coordinates in the previous frame and the report point coordinates in the current frame, and the unintentional flicking distance is a sum of all unintentional flicking distances from the previous frame to the current frame.

Optionally, in a possible implementation, when the flicking distance between the report point coordinates in the previous frame and the report point coordinates in the current frame is less than a preset threshold, and a report point is in a tapped state, the report point coordinates in the previous frame are used as the report point coordinates in the current frame.

Optionally, in yet another possible implementation, the using report point coordinates in a previous frame as report point coordinates in a current frame if it is determined that a capacitance signal in the current frame and a capacitance signal in the previous frame that are in the input information meet a preset condition includes:

if it is determined that a first capacitance signal change value, a second capacitance signal change value, and movement efficiency meet a preset condition, using the report point coordinates in the previous frame as the report point coordinates in the current frame; or if it is determined that a first capacitance signal change value, a second capacitance signal change value, movement efficiency, and a ratio meet a preset condition, using the report point coordinates in the previous frame as the report point coordinates in the current frame.

The first capacitance signal change value is a change value of the capacitance signal in the current frame relative to the capacitance signal in the previous frame in a movement direction of a gravity center of a capacitance bright spot, the second capacitance signal change value is a change value of the capacitance signal in the current frame relative to the capacitance signal in the previous frame in a direction opposite to the movement direction of the gravity center of the capacitance bright spot, a third capacitance change value is an overall capacitance signal change value used for movement of the gravity center of the capacitance bright spot, and the ratio is a ratio of displacement of the gravity center of the capacitance bright spot to a movement distance of the gravity center of the capacitance bright spot in a specific time period.

Optionally, in a possible implementation, if it is determined that the first capacitance signal change value, the second capacitance signal change value, and the movement efficiency meet the preset condition, the report point coordinates in the previous frame are used as the report point coordinates in the current frame, and the preset condition includes:

both of the first capacitance signal change value and the second capacitance signal change value are greater than zero, and the first capacitance signal change value and the second capacitance signal change value are greater than preset thresholds respectively; or both of the first capacitance signal change value and the second capacitance signal change value are less than zero, and the first capacitance signal change value and the second capacitance signal change value are less than preset thresholds respectively; or the first capacitance signal change value is greater than zero, the second capacitance signal change value is less than zero, and the movement efficiency is greater than a preset threshold; or both of an absolute value of the first capacitance signal change value and an absolute value of the second capacitance signal change value are less than a preset threshold.

Optionally, in a possible implementation, the control method further includes:

when it is determined that the report point coordinates in the current frame are not the report point coordinates in the previous frame, compensating the report point coordinates in the current frame and report point coordinates after the current frame. A visual "jumping" effect brought to the user after report point flicking stops is avoided by compensating the report point, so that user experience is improved.

Optionally, in another possible implementation, the compensating the report point coordinates in the current frame and report point coordinates after the current frame includes:

compensating report point coordinates in each frame by using (stepX, stepY) or (offsetRatio x $\Delta$x, offsetRatio x $\Delta$y), where stepX and offsetRatio x $\Delta$x each are a compensation amount of the coordinates in each frame in the x direction, and stepY and offsetRatio x $\Delta$y each are a compensation amount in the y direction. A visual "jumping" effect brought to the user after report point flicking stops is avoided by compensating the report point, so that user experience is improved.

According to a second aspect, a terminal is provided, and the terminal may include:

a processing unit, configured to obtain input information, where the input information includes a capacitance signal and report point coordinates that are generated when a user performs an operation on a terminal screen.

The processing unit is further configured to: use report point coordinates in a previous frame as report point coordinates in a current frame if it is determined that a capacitance signal in the current frame and a capacitance signal in the previous frame that are in the input information meet a preset condition; or use report point coordinates in a previous frame as report point coordinates in a current frame if it is determined that the report point coordinates in the current frame and report point coordinates in a first frame that are in the input information meet a preset condition, to suppress flicking caused by an unintentional operation of the user.

In a possible implementation, the capacitance signal includes a strength value of a capacitance bright spot, the strength value of the capacitance bright spot is data corresponding to each element in the capacitance bright spot, each element is corresponding to a rectangular area at a corresponding position on the terminal screen, and that the processing unit uses report point coordinates in a previous frame as report point coordinates in a current frame if it is determined that a capacitance signal in the current frame and a capacitance signal in the previous frame that are in the input information meet a preset condition includes:

if it is determined that one or more of a peak ratio, a maximum value in sums of strength values of the capacitance bright spot, and a maximum value of the capacitance bright spot meets/meet a preset condition, the processing unit uses the report point coordinates in the previous frame as the report point coordinates in the current frame; or if it is determined that a peak ratio, a maximum value in sums of strength values of the capacitance bright spot, a maximum value of the capacitance bright spot, and a report point status meet a preset condition, the processing unit uses the report point coordinates in the previous frame as the report point coordinates in the current frame.

The maximum value of the capacitance bright spot is a maximum value in strength values corresponding to a plurality of elements in the capacitance bright spot. The peak ratio is a ratio of a maximum value of a capacitance bright spot in the current frame to a maximum value of a capacitance bright spot in the previous frame. The maximum value in the sums of the strength values of the capacitance bright spot is a maximum value in sums of data that is of four adjacent elements and that includes the maximum value in the strength values of the capacitance bright spot.

Optionally, in a possible implementation, when each of the one or more of the peak ratio, the maximum value in the sums of the strength values of the capacitance bright spot, and the maximum value of the capacitance bright spot is less than a preset threshold, or when all of the peak ratio, the maximum value in the sums of the strength values of the capacitance bright spot, and the maximum value of the capacitance bright spot are less than corresponding preset thresholds, and a report point is in a tapped state, the report point coordinates in the previous frame are used as the report point coordinates in the current frame.

Optionally, in another possible implementation, the capacitance signal further includes a major axis value and a minor axis value of a capacitance bright spot, and that the processing unit uses report point coordinates in a previous frame as report point coordinates in a current frame if it is determined that a capacitance signal in the current frame and a capacitance signal in the previous frame that are in the input information meet a preset condition includes:

if it is determined that displacement from the report point coordinates in the previous frame to the report point coordinates in the current frame, and the major axis value and the minor axis value of the capacitance bright spot meet a preset condition, the processing unit uses the report point coordinates in the previous frame as the report point coordinates in the current frame.

Optionally, in a possible implementation, when the displacement from the report point coordinates in the previous frame to the report point coordinates in the current frame is greater than a preset threshold $dist_i^o$, and an axis change value is greater than the preset threshold $dist_i^o$, the report point coordinates in the previous frame are used as the report point coordinates in the current frame.

i represents the current frame, i is a positive integer greater than 1, and the axis change value meets the following formula:

$$\text{Axis change value} = \sqrt{\begin{array}{l}(\text{Major axis value in a current frame} - \\ \text{Major axis value in a previous frame})^2 + \\ (\text{Minor axis value in the current frame} - \\ \text{Minor axis value in the previous frame})^2\end{array}}.$$

Optionally, in still another possible implementation, that the processing unit is configured to use report point coordinates in a previous frame as report point coordinates in a current frame if it is determined that the report point coordinates in the current frame and the report point coordinates in the previous frame that are in the input information meet a preset condition includes:

if it is determined that a flicking distance between the report point coordinates in the previous frame and the report point coordinates in the current frame meets the preset condition, the processing unit uses the report point coordinates in the previous frame as the report point coordinates in the current frame.

The flicking distance is obtained by subtracting an unintentional flicking distance from a distance between the report point coordinates in the previous frame and the report point coordinates in the current frame, and the unintentional flicking distance is a sum of all unintentional flicking distances from the previous frame to the current frame.

Optionally, in a possible implementation, when the flicking distance between the report point coordinates in the previous frame and the report point coordinates in the current frame is less than a preset threshold, and a report point is in a tapped state, the report point coordinates in the previous frame are used as the report point coordinates in the current frame.

Optionally, in yet another possible implementation, that the processing unit uses report point coordinates in a previous frame as report point coordinates in a current frame if it is determined that a capacitance signal in the current frame and a capacitance signal in the previous frame that are in the input information meet a preset condition includes:

if it is determined that a first capacitance signal change value, a second capacitance signal change value, and movement efficiency meet a preset condition, the processing unit uses the report point coordinates in the previous frame as the report point coordinates in the current frame; or if it is determined that a first capacitance signal change value, a second capacitance signal change value, movement efficiency, and a ratio meet a preset condition, the processing unit uses the report point coordinates in the previous frame as the report point coordinates in the current frame.

The first capacitance signal change value is a change value of the capacitance signal in the current frame relative to the capacitance signal in the previous frame in a movement direction of a gravity center of a capacitance bright spot, the second capacitance signal change value is a change value of the capacitance signal in the current frame relative to the capacitance signal in the previous frame in a direction opposite to the movement direction of the gravity center of the capacitance bright spot, a third capacitance change value is an overall capacitance signal change value used for movement of the gravity center of the capacitance bright spot, and the ratio is a ratio of displacement of the gravity center of the capacitance bright spot to a movement distance of the gravity center of the capacitance bright spot in a specific time period.

Optionally, in a possible implementation, if it is determined that the first capacitance signal change value, the second capacitance signal change value, and the movement efficiency meet the preset condition, the processing unit uses the report point coordinates in the previous frame as the report point coordinates in the current frame, and the preset condition includes:

both of the first capacitance signal change value and the second capacitance signal change value are greater than zero, and the first capacitance signal change value and the second capacitance signal change value are greater than preset thresholds respectively; or both of the first capacitance signal change value and the second capacitance signal change value are less than zero, and the first capacitance signal change value and the second capacitance signal change value are less than preset thresholds respectively; or the first capacitance signal change value is greater than zero, the second capacitance signal change value is less than zero, and the movement efficiency is greater than a preset threshold; or both of an absolute value of the first capacitance signal change value and an absolute value of the second capacitance signal change value are less than a preset threshold.

Optionally, in a possible implementation, the processing unit is further configured to: when it is determined that the report point coordinates in the current frame are not the report point coordinates in the previous frame, compensate the report point coordinates in the current frame and report point coordinates after the current frame. A visual "jumping" effect brought to the user after report point flicking stops is avoided by compensating the report point, so that user experience is improved.

Optionally, in another possible implementation, that the processing unit compensates the report point coordinates in the current frame and report point coordinates after the current frame includes:

the processing unit compensates report point coordinates in each frame by using (stepX, stepY) or (offsetRatio x Δx, offsetRatio x Δy), where stepX and offsetRatio x Δx each are a compensation amount of the coordinates in each frame in the x direction, and stepY and offsetRatio x Δy each are a compensation amount in the y direction. A visual "jumping" effect brought to the user after report point flicking stops is avoided by compensating the report point, so that user experience is improved.

According to a third aspect, a terminal is provided. The terminal includes a memory, a processor, and a computer program that is stored in the memory and that can be run on the processor. When the processor executes the program, the following steps are implemented:

obtaining input information, where the input information includes a capacitance signal and report point coordinates that are generated when a user performs an operation on a terminal screen; and using report point coordinates in a previous frame as report point coordinates in a current frame if it is determined that a capacitance signal in the current frame and a capacitance signal in the previous frame that are in the input information meet a preset condition; or using report point coordinates in a previous frame as report point coordinates in a current frame if it is determined that the report point coordinates in the current frame and report point coordinates in a first frame that are in the input information meet a preset condition, to suppress flicking caused by an unintentional operation of the user.

In a possible implementation, the capacitance signal includes a strength value of a capacitance bright spot, the strength value of the capacitance bright spot is data corresponding to each element in the capacitance bright spot, each element is corresponding to a rectangular area at a corresponding position on the terminal screen, and that the processor uses report point coordinates in a previous frame as report point coordinates in a current frame if it is determined that a capacitance signal in the current frame and a capacitance signal in the previous frame that are in the input information meet a preset condition includes:

if it is determined that one or more of a peak ratio, a maximum value in sums of strength values of the capacitance bright spot, and a maximum value of the capacitance bright spot meets/meet a preset condition, the processor uses the report point coordinates in the previous frame as the report point coordinates in the current frame; or if it is determined that a peak ratio, a maximum value in sums of strength values of the capacitance bright spot, a maximum value of the capacitance bright spot, and a report point status meet a preset condition, the processor uses the report point coordinates in the previous frame as the report point coordinates in the current frame.

The maximum value of the capacitance bright spot is a maximum value in strength values corresponding to a plurality of elements in the capacitance bright spot. The peak ratio is a ratio of a maximum value of a capacitance bright spot in the current frame to a maximum value of a capacitance bright spot in the previous frame. The maximum value in the sums of the strength values of the capacitance bright spot is a maximum value in sums of data that is of four adjacent elements and that includes the maximum value in the strength values of the capacitance bright spot.

Optionally, in a possible implementation, when each of the one or more of the peak ratio, the maximum value in the sums of the strength values of the capacitance bright spot, and the maximum value of the capacitance bright spot is less than a preset threshold, or when all of the peak ratio, the maximum value in the sums of the strength values of the capacitance bright spot, and the maximum value of the capacitance bright spot are less than corresponding preset thresholds, and a report point is in a tapped state, the report point coordinates in the previous frame are used as the report point coordinates in the current frame.

Optionally, in another possible implementation, the capacitance signal further includes a major axis value and a minor axis value of a capacitance bright spot, and that the processor uses report point coordinates in a previous frame as report point coordinates in a current frame if it is determined that a capacitance signal in the current frame and a capacitance signal in the previous frame that are in the input information meet a preset condition includes:

if it is determined that displacement from the report point coordinates in the previous frame to the report point coordinates in the current frame, and the major axis value and the minor axis value of the capacitance bright spot meet a preset condition, the processor uses the report point coordinates in the previous frame as the report point coordinates in the current frame.

Optionally, in a possible implementation, when the displacement from the report point coordinates in the previous frame to the report point coordinates in the current frame is greater than a preset threshold $dist_i^0$, and an axis change value is greater than the preset threshold $dist_i^0$, the report point coordinates in the previous frame are used as the report point coordinates in the current frame.

i represents the current frame, i is a positive integer greater than 1, and the axis change value meets the following formula:

$$\text{Axis change value} = \sqrt{\begin{array}{l}(\text{Major axis value in a current frame} - \\ \text{Major axis value in a previous frame})^2 + \\ (\text{Minor axis value in the current frame} - \\ \text{Minor axis value in the previous frame})^2\end{array}}.$$

Optionally, in still another possible implementation, that the processor is configured to use report point coordinates in a previous frame as report point coordinates in a current frame if it is determined that the report point coordinates in the current frame and report point coordinates in a first frame that are in the input information meet a preset condition includes:

if it is determined that a flicking distance between the report point coordinates in the first frame and the report point coordinates in the current frame meets the preset condition, the processor uses the report point coordinates in the previous frame as the report point coordinates in the current frame.

The flicking distance is obtained by subtracting an unintentional flicking distance from a distance between the report point coordinates in the previous frame and the report point coordinates in the current frame, and the unintentional flicking distance is a sum of all unintentional flicking distances from the previous frame to the current frame.

Optionally, in a possible implementation, when the flicking distance between the report point coordinates in the previous frame and the report point coordinates in the current frame is less than a preset threshold, and a report point is in a tapped state, the report point coordinates in the previous frame are used as the report point coordinates in the current frame.

Optionally, in yet another possible implementation, that the processor uses report point coordinates in a previous frame as report point coordinates in a current frame if it is determined that a capacitance signal in the current frame and a capacitance signal in the previous frame that are in the input information meet a preset condition includes:

if it is determined that a first capacitance signal change value, a second capacitance signal change value, and movement efficiency meet a preset condition, the processor uses the report point coordinates in the previous frame as the report point coordinates in the current frame; or if it is determined that a first capacitance signal change value, a second capacitance signal change value, movement efficiency, and a ratio meet a preset condition, the processor uses the report point coordinates in the previous frame as the report point coordinates in the current frame.

The first capacitance signal change value is a change value of the capacitance signal in the current frame relative to the capacitance signal in the previous frame in a movement direction of a gravity center of a capacitance bright spot, the second capacitance signal change value is a change value of the capacitance signal in the current frame relative to the capacitance signal in the previous frame in a direction opposite to the movement direction of the gravity center of the capacitance bright spot, a third capacitance change value is an overall capacitance signal change value used for movement of the gravity center of the capacitance bright spot, and the ratio is a ratio of displacement of the gravity center of the capacitance bright spot to a movement distance of the gravity center of the capacitance bright spot in a specific time period.

Optionally, in a possible implementation, if it is determined that the first capacitance signal change value, the second capacitance signal change value, and the movement efficiency meet the preset condition, the processor uses the report point coordinates in the previous frame as the report point coordinates in the current frame, and the preset condition includes:

both of the first capacitance signal change value and the second capacitance signal change value are greater than zero, and the first capacitance signal change value and the second capacitance signal change value are greater than preset thresholds respectively; or both of the first capacitance signal change value and the second capacitance signal change value are less than zero, and the first capacitance signal change value and the second capacitance signal change value are less than preset thresholds respectively; or the first capacitance signal change value is greater than zero, the second capacitance signal change value is less than zero, and the movement efficiency is greater than a preset threshold; or both of an absolute value of the first capacitance signal change value and an absolute value of the second capacitance signal change value are less than a preset threshold.

Optionally, in some possible implementations, the processor is further configured to: when it is determined that the report point coordinates in the current frame are not the report point coordinates in the previous frame, compensate the report point coordinates in the current frame and report point coordinates after the current frame. A visual "jumping" effect brought to the user after report point flicking stops is avoided by compensating the report point, so that user experience is improved.

Optionally, in another possible implementation, that the processor compensates the report point coordinates in the current frame and report point coordinates after the current frame includes:

the processor compensates report point coordinates in each frame by using (stepX, stepY) or (offsetRatio x Δx, offsetRatio x Δy), where stepX and offsetRatio x Δx each are a compensation amount of the coordinates in each frame in the x direction, and stepY and offsetRatio x Δy each are a compensation amount in the y direction. A visual "jumping" effect brought to the user after report point flicking stops is avoided by compensating the report point, so that user experience is improved.

According to a fourth aspect, a computer readable storage medium is provided, and includes an instruction. When the instruction is run on a device, the device is enabled to perform the method according to any one of the first aspect or the possible implementations of the first aspect.

According to a fifth aspect, a computer program product including an instruction is provided. When the instruction is run on a computer, the computer is enabled to perform the method according to any one of the first aspect or the possible implementations of the first aspect.

According to the control method and the terminal, flicking determining or a flick operation of the terminal that is caused by the unintentional operation of the user is suppressed through a change between the capacitance signal in the current frame and the capacitance signal in the previous frame or between the report point coordinates in the current frame and the report point coordinates in the first frame. Therefore, user experience is improved.

BRIEF DESCRIPTION OF DRAWINGS

FIG. 5(a), FIG. 5(b), and FIG. 5(c)-1 and FIG. 5(c)-2 are a flowchart of a control method according to an embodiment of the present invention;

FIG. 6(a)-1 and FIG. 6(a)-2 and FIG. 6(b)-1 and FIG. 6(b)-2 are a flowchart of another control method according to an embodiment of the present invention;

DESCRIPTION OF EMBODIMENTS

Embodiments of the present invention provide a control method and a terminal. A capacitive touchscreen is disposed on the terminal. When a user performs a flick operation or a tap operation on the terminal screen, the terminal obtains a capacitance signal and report point coordinates, and determines, based on the capacitance signal and the report point coordinates, whether to suppress or flick a report point.

In the terminal, an algorithm for suppressing report point flicking is set, and an algorithm for compensating report point coordinates after suppression on a report point stops is set, so that flicking caused by an unintentional operation performed by the user on the terminal operation screen is suppressed, and after suppression on the report point stops, a visual "jumping" effect that is of the report point and that is generated when the user performs the flick operation on the terminal screen is avoided. After the suppression stops, deviation compensation is performed on report point coordinates in each frame, so that a deviation caused by report point flicking suppression is completely compensated. In this way, when performing the flick operation, the user visually perceives that the report point moves smoothly, and therefore, user experience is improved.

In the embodiments of the present invention, the report point is a point at which the user taps or presses the terminal screen when the user performs an operation on the terminal screen. The report point coordinates are position coordinates of the report point on the terminal screen. A reference point of the report point coordinates, that is, an origin of coordinates (0, 0) may be customized. For example, the terminal is a mobile phone, and the origin of coordinates may be set at an upper left corner, an upper right corner, or the like on a screen of the mobile phone.

Figure 1:
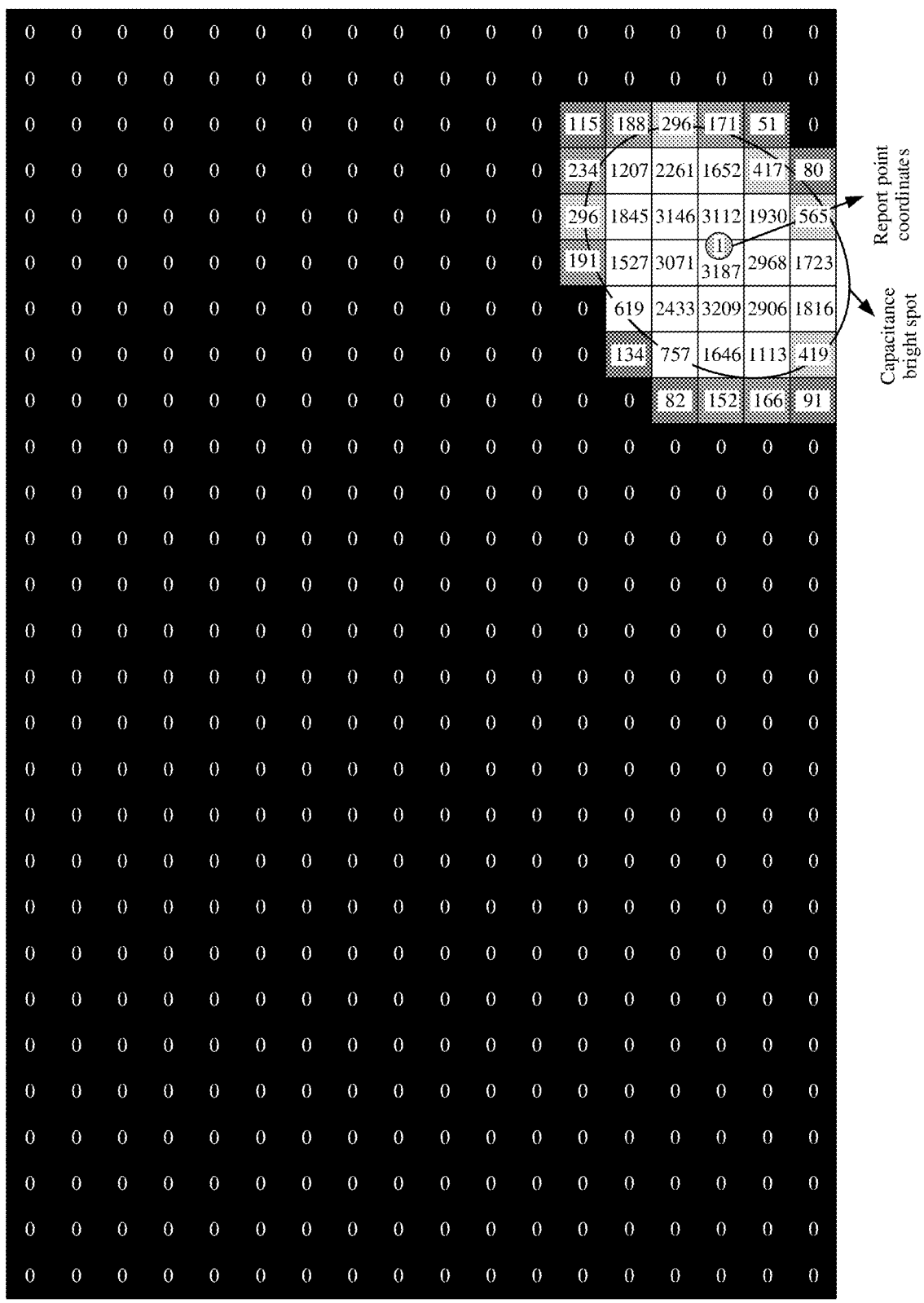
FIG. 1 is a schematic diagram of a capacitance bright spot according to an embodiment of the present invention.

When the user performs an operation such as tapping, pressing, or pressing and flicking on the terminal screen, the capacitance signal is generated on the capacitive touchscreen. Actually, the capacitance signal is a matrix. As shown in FIG. 1, each element in the matrix is corresponding to a rectangular area at a corresponding position on the capacitive touchscreen, and data on the element represents a strength value of the capacitance signal in the area. If the capacitance signal at a corresponding position that is on the capacitive touchscreen and that is touched by the user is relatively strong, a capacitance bright spot (as shown in FIG. 1) is generated. The capacitance bright spot is a nine-square grid, and the capacitance signal is relatively weak at another position. The capacitive touchscreen reports the capacitance signal of the entire capacitive touchscreen at a fixed frequency. Based on the capacitance signal, the terminal determines, through calculation, whether there is a need to report a point, and calculates a position, in other words, report point coordinates, of each report point.

It should be noted that how to calculate report point coordinates is in the prior art. In the prior art, all capacitance bright spots on the terminal screen are obtained through calculation based on a flooding algorithm. The capacitance bright spot is corresponding to a position at which the user touches the capacitive touchscreen, and the capacitance bright spot is matched with report point coordinates. Only when the capacitance bright spot meets a preset condition, a report point is generated. In other words, not all the capacitance bright spots can have a corresponding report point. The flooding algorithm is on a basis of breadth-first search. Strength values of the capacitance signal that are corresponding to all elements in the capacitance bright spot need to be obtained through calculation, and a maximum value of the capacitance signal in the capacitance bright spot, in other words, a strength value greater than strength values of the capacitance signal in eight adjacent squares, is obtained. Then, flooding is started from the maximum value. In a process of the breadth-first search, a fixed threshold is used for determining. When a strength value of the capacitance signal is greater than the fixed threshold, an element corresponding to the searched strength value of the capacitance signal is added to an area of a current capacitance bright spot. After the breadth-first search ends, a report point is matched with the capacitance bright spot. When a position of report point coordinates is included in the area of the capacitance bright spot, it is considered that the report point is a report point corresponding to the capacitance bright spot.

In the embodiments of the present invention, a concept, that is, a life cycle of a capacitance bright spot, further needs to be clearly understood. In a process from a moment at which the user taps the terminal screen with a finger to a moment at which the user ends tapping the terminal screen, in other words, a moment at which the finger leaves the terminal screen, a continuous capacitance bright spot is generated on the terminal screen within a time period in which the user taps the terminal screen. A shape of the capacitance bright spot continuously changes with an area and a position of the finger touching the terminal screen. In the embodiments of the present invention, a time period from appearance to disappearance of the capacitance bright spot is referred to as one life cycle of the capacitance bright spot. A capacitance bright spot of one life cycle is corresponding to capacitance signals in several consecutive frames.

In the embodiments of the present invention, the terminal has a function of managing a capacitance bright spot. After obtaining a capacitance bright spot in a current frame through calculation, the terminal determines, through a search, whether there is a capacitance bright spot that is in a previous frame and that is corresponding to the capacitance bright spot in the current frame. If there is the capacitance bright spot that is in the previous frame and that is corresponding to the capacitance bright spot in the current frame, the capacitance bright spot in the current frame is stored in a life cycle corresponding to the capacitance bright spot in the previous frame for management. If there is no capacitance bright spot that is in the previous frame and that is corresponding to the capacitance bright spot in the current frame, a new life cycle is established, and the capacitance bright spot in the current frame is stored in the newly established life cycle for management.

The following describes the control method in the embodiments of the present invention with reference to the accompanying drawing.

In the embodiments of the present invention, a report point has two states: 1. a tapped (CLICK) state, indicating that the report point is a report point of a tap operation; and 2. a pressed (FLICK) state, indicating that the report point is a report point of a flick operation. Different conditions are set for the terminal to determine whether the report point starts to flick, and how to compensate report point coordinates after the report point flicks.

Figures 2, 3:
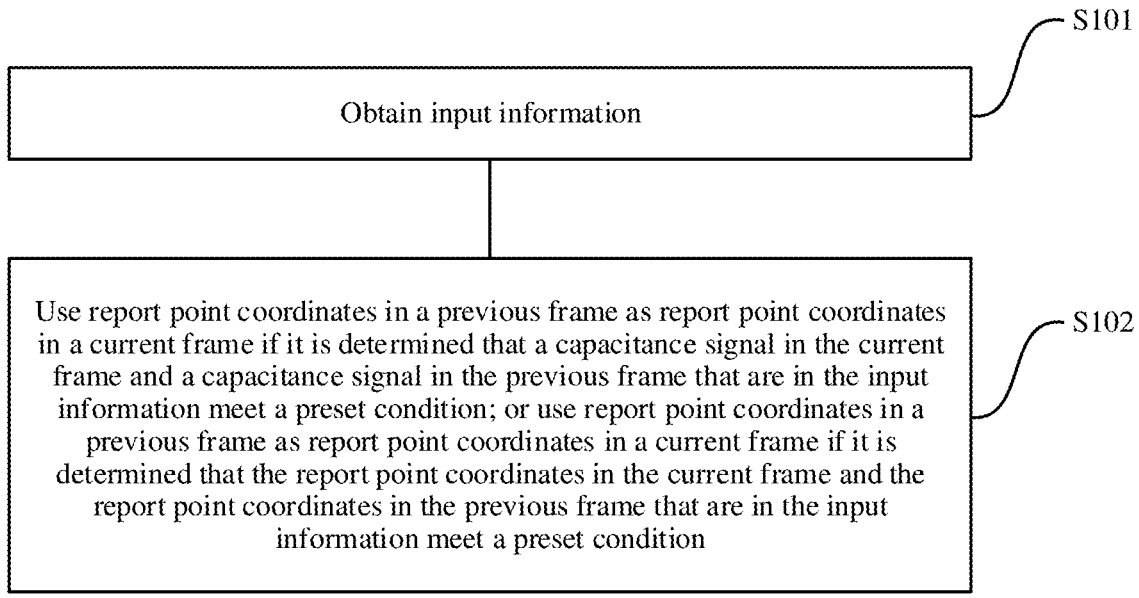
FIG. 2 is a flowchart of a control method according to an embodiment of the present invention.
FIG. 3 is a schematic diagram of strength values of a capacitance bright spot according to an embodiment of the present invention.

FIG. 2 is a flowchart of a control method according to an embodiment of the present invention. As shown in FIG. 2, the method may include the following steps.

S101. Obtain input information.

The input information generated when a user performs an operation on a terminal screen is obtained, and the input information includes a capacitance signal and report point coordinates. The capacitance signal includes a strength value of a capacitance bright spot. The strength value of the capacitance bright spot is data corresponding to each element in the capacitance bright spot. As shown in FIG. 1, each element is corresponding to a rectangular area at a corresponding position on the terminal screen.

Based on a capacitance signal in each frame in the obtained input information, a terminal may determine a strength value of a capacitance bright spot in the capacitance signal in each frame. This may be briefly referred to as strength value determining. Based on the capacitance signal in each frame in the input information, the terminal may determine the strength value of the capacitance bright spot in the capacitance signal in each frame, and determine a maximum strength value of the capacitance bright spot in the capacitance signal in each frame. In this embodiment of the present invention, the maximum strength value of the capacitance bright spot may also be referred to as a maximum value "Peak" of the capacitance bright spot. As shown in FIG. 3, the "Peak" is 3714. Based on maximum values of capacitance bright spots in two adjacent frames, a peak ratio "PeakRatio" is obtained through calculation.

Herein, an example in which a capacitance signal in a current frame is a capacitance signal in an $i^{th}$ frame, a capacitance signal in a previous frame is a capacitance signal in an $(i-1)^{th}$ frame, and a capacitance signal in a next frame is a capacitance signal in an $(i+1)^{th}$ frame is used for description. i is a positive integer greater than 1. A maximum value of a capacitance bright spot in the $i^{th}$ frame is $Peak_i$, and a maximum value of a capacitance bright spot in the $(i-1)^{th}$ frame is $Peak_{i-1}$. $PeakRatio_i$ is a ratio of $Peak_i$ to $Peak_{i-1}$, in other words, $$PeakRatio_i = \frac{Peak_i}{Peak_{i-1}}.$$

Further, the terminal may calculate a maximum value in sums of strength values of the capacitance bright spot based on the strength values of the capacitance bright spot. In a nine-square grid (as shown in FIG. 1) using a maximum value of a capacitance bright spot as a center, there are four four-square grids that include the maximum value of the capacitance bright spot. For the four four-square girds, a maximum value in sums of strength values of the capacitance bright spot is SquareSum. As shown in FIG. 3, SquareSum=3714+2948+2830+2694=12186. A maximum value in sums of strength values of the capacitance bright spot in the $i^{th}$ frame is $SquareSum_i$, and a maximum value in sums of strength values of the capacitance bright spot in the $(i-1)^{th}$ frame is $SquareSum_{i-1}$. In this embodiment of the present invention, the terminal may further determine $SquareRatio_i$. $SquareRatio_i$ is a ratio of $SquareSum_i$ to $SquareSum_{i-1}$, in other words, $$SquareSum_i = \frac{SquareSum_i}{SquareSum_{i-1}}.$$

Optionally, in this embodiment of the present invention, the terminal may further use an ellipse to approximately simulate the capacitance bright spot generated when the user performs the operation on the terminal screen. The capacitance bright spot has a major axis and a minor axis. In a process in which the user lifts or drops a finger on the terminal screen, the major axis and the minor axis of the capacitance bright spot may change relatively greatly. The terminal determines a major axis value and a minor axis value of a capacitance bright spot in each frame based on the capacitance signal in each frame in the input information. In the $i^{th}$ frame, a major axis value is $major_i$, and a minor axis value is $minor_i$. In the $(i-1)^{th}$ frame, a major axis value is $major_{i-1}$, and a minor axis value is $minor_{i-1}$. An overall change of a major axis and a minor axis between the $i^{th}$ frame and the $(i-1)^{th}$ frame is $axisChange_i$. Displacement of an original report point between the $i^{th}$ frame and the $(i-1)^{th}$ frame is $dist_i^0$. The original report point is position coordinates of the report point obtained through calculation by the terminal based on a touchscreen (touchscreen panel, TP) algorithm, namely, position coordinates on which report point coordinate compensation is not performed. For the report point coordinate compensation, refer to the following description.

$$axis\ Change_i = \sqrt{(major_i - major_{i-1})^2 + (minor_i - minor_{i-1})^2}$$

$$dist_i^0 = \sqrt{(x_i^0 - x_{i-1}^0)^2 + (y_i^0 - y_{i-1}^0)^2}$$

$(x_i^0, y_i^0)$ is original report point coordinates in the $i^{th}$ frame, and $(x_{i-1}^0, y_{i-1}^0)$ is original report point coordinates in the $(i-1)^{th}$ frame.

Optionally, in this embodiment of the present invention, the terminal may further determine a flicking distance, and calculate a flicking distance $move_i^0$ of a report point between the $i^{th}$ frame and a first frame. The displacement $move_i^0$ is obtained by subtracting a flicking distance $unnormalDist_i$ unintentionally generated by the user between the $i^{th}$ frame and the first frame from a distance between the original report point coordinates in the $i^{th}$ frame and the original report point in the first frame. $unnormalDist_i$ is an accumulated value of all flicking distances unintentionally generated by the user from the first frame to the $i^{th}$ frame. A formula is as follows:

$$move_i^0 = \sqrt{(x_i^0 - x_1^0)^2 + (y_i^0 - y_1^0)^2} - unnormalDist_i.$$

Figure 4:
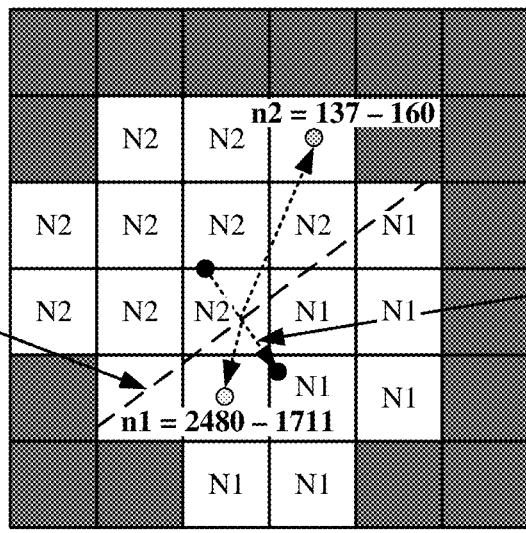
FIG. 4 is a schematic diagram of a capacitance signal change according to an embodiment of the present invention.

Optionally, in this embodiment of the present invention, the terminal may further use n1, n2, and eiff to describe a change of the capacitance bright spot between two frames during one-time interaction. n1 represents a capacitance signal change value in a movement direction of a gravity center of the capacitance bright spot, n2 represents a capacitance signal change value in a direction opposite to the movement direction of the gravity center of the capacitance bright spot, and eiff represents an overall capacitance signal change value used between the two frames to complete gravity center displacement of one unit. Herein, the capacitance signal change values that are represented by n1, n2, and eiff are obtained from the strength values of the capacitance signal that are corresponding to all elements in the capacitance bright spot, namely, the strength values of the capacitance bright spot. As shown in FIG. 4, between two adjacent frames, n1=2408-1711, and n2=137-160.

Herein, the gravity center of the capacitance bright spot is similar to a gravity center of an object. A center of the object is determined by a physical weight, and the gravity center of the capacitance bright spot is determined by a strength value of the capacitance bright spot. The gravity center of the capacitance bright spot meets the following formulas:

$$x_{weight} = \frac{\sum_{i=1}^{n} x_i * Capacity_i}{\sum_{i=1}^{n} x_i}, \text{ and}$$

$$y_{weight} = \frac{\sum_{i=1}^{n} y_i * Capacity_i}{\sum_{i=1}^{n} y_i}.$$

x and y each represent a coordinate value of each element in each capacitance bright spot, "Capacity" represents a strength value of the capacitance signal, i represents the $i^{th}$ frame, and n represents an $n^{th}$ frame.

For capacitance signals in two adjacent frames during a flick operation, n1, n2, and eiff may have the following cases: n1 is significantly greater than 0, n2 is significantly less than 0, and eiff is relatively small. For a case in which tapping changes to flicking, n1, n2, and eiff may have the following values:

1. Both n1 and n2 are greater than 0. In this case, it may be considered that strength of the capacitance signal obviously increases. Alternatively, both n1 and n2 are less than 0. In this case, it may be considered that strength of the capacitance signal obviously decreases.

2. n1 is greater than 0, and n2 is less than 0. However, a difference between absolute values of n1 and n2 is relatively large due to an asymmetric change, and a value of eiff is relatively large.

3. Absolute values of n1 and n2 are both small.

In this embodiment of the present invention, it may be assumed that, as time passes, a capacitance bright spot S1 (x1, y1) changes to a capacitance bright spot S2 (x2, y2), and a center of gravity centers of the two capacitance bright spots are:

$$(X, Y) = \left( \frac{\overline{x1} + \overline{x2}}{2}, \frac{\overline{y1} + \overline{y2}}{2} \right).$$

A vector of gravity center displacement is:

$$(dx, dy) = (\overline{x2} - \overline{x1}, \overline{y2} - \overline{y1}).$$

Calculation formulas of n1, n2, and eiff may be as follows:

$$n1 = \sum_{(x,y)} C((x, y, S2) - C(x, y, S1)) * 1((x - X) * dx + (y - Y) * dy \geq 0),$$

$$n2 = \sum_{(x,y)} C((x, y, S2) - C(x, y, S1)) * 1((x - X) * dx + (y - Y) * dy < 0),$$

and $$eiff = \frac{|n1 + n2|}{\sqrt{dx^2 + dy^2}}.$$

C(x, y, S1) and C(x, y, S2) each are equivalent to an f(x) function.

In this embodiment of the present invention, the terminal may further obtain a ratio (Ratio). The ratio is a ratio of displacement of the gravity center of the capacitance bright spot to a movement distance of the gravity center in specific time period. A capacitance bright spot sequence that is formed in a process of interaction between the user and the terminal and that is continuous in a time period may be {S1, S2, S3, . . . , Si}. In actual calculation, a length of the capacitance bright spot sequence has an upper limit, and an upper limit parameter may be set to WINDOW_SIZE. The ratio of the displacement of the gravity center to the movement distance of the gravity center may be calculated according to the following formula:

$$ratio = \frac{\sqrt{(\overline{x_i} - \overline{x_1})^2 + (\overline{y_i} - \overline{y_1})^2}}{\sum_{j=1}^{i-1} \sqrt{(\overline{x_{j+1}} - \overline{x_j})^2 + (\overline{y_{j+1}} - \overline{y_j})^2}}.$$

In this embodiment of the present invention, a case in which the gravity center moves due to jitter may be considered. In this case, the ratio is relatively small. In an active flicking process of the user, the ratio is close to 1. When a limitation of a condition of n1, n2, and eiff is met, if the ratio is closer to 1, the user is more likely to actively or consciously perform a flick operation. In this case, when the ratio is very small, an operation is determined as a flick operation only when the user consciously moves the gravity center for an enough long distance; otherwise, the terminal suppresses flicking. In addition, it may be further considered that the finger of the user has different sizes in all directions, unintentional flicking of the finger of the user has different distances in all the directions, and flicking lengths required in all the directions are also different. The terminal may perform ellipse fitting on a capacitance bright spot obtained based on a flooding algorithm, and calculate a length of a fitted ellipse in a direction according to a polar coordinate equation of the ellipse. Only when the displacement of the gravity center exceeds a specific proportion of a specific flicking length of the finger, an operation is determined as a flick operation, and a report point flicks.

S102. Use report point coordinates in the previous frame as report point coordinates in the current frame if it is determined that the capacitance signal in the current frame and the capacitance signal in the previous frame that are in the input information meet a preset condition; or use report point coordinates in the previous frame as report point coordinates in the current frame if it is determined that the report point coordinates in the current frame and the report point coordinates in the previous frame that are in the input information meet a preset condition.

In this embodiment of the present invention, whether to use the report point coordinates in the previous frame as the report point coordinates in the current frame, in other words, whether to suppress the report point flicking, may be determined by determining the strength values of the capacitance bright spots that are in the capacitance signal in the current frame and the capacitance signal in the previous frame, by determining the major axis value and the minor axis value, or by determining the flicking distance.

In the technical solutions of example embodiments of the present invention, whether to suppress the report point may be determined in the following several manners.

In an embodiment of the present invention, the terminal may use the report point coordinates in the previous frame as the report point coordinates in the current frame if it is determined that one or more of the peak ratio $PeakRatio_i$, the maximum value $SquareSum_i$ in the sums of the strength values of the capacitance bright spot, and the maximum value $Peak_i$ of the capacitance bright spot meets/meet a preset condition. Alternatively, the terminal uses the report point coordinates in the previous frame as the report point coordinates in the current frame if it is determined that the peak ratio $PeakRatio_i$, the maximum value $SquareSum_i$ in the sums of the strength values of the capacitance bright spot, the maximum value $Peak_i$ of the capacitance bright spot, and a report point status meet a preset condition. The maximum value of the capacitance bright spot is a maximum value in strength values corresponding to a plurality of elements in the capacitance bright spot. The peak ratio is a ratio of a maximum value of the capacitance bright spot in the current frame to a maximum value of the capacitance bright spot in the previous frame. The maximum value in the sums of the strength values of the capacitance bright spot is a maximum value in sums of data that is of four adjacent elements and that includes the maximum value in the strength values of the capacitance bright spot. The preset condition is as follows:

For example, when $PeakRatio_i$ is less than a threshold, $SquareSum_i$ is less than a threshold, or $Peak_i$ is less than a threshold, the report point flicking is suppressed.

For another example, when $PeakRatio_i$ is less than a threshold, $SquareSum_i$ is less than a threshold, or $Peak_i$ is less than a threshold, and the report point is in a CLICK state, the report point flicking is suppressed.

Optionally, in another embodiment of the present invention, the terminal may determine whether displacement from the report point coordinates in the previous frame to the report point coordinates in the current frame, and the major axis value and the minor axis value of the capacitance bright spot meet a preset condition, and use the report point coordinates in the previous frame as the report point coordinates in the current frame when the preset condition is met.

The preset condition may be that, for example, when the displacement from the report point coordinates in the previous frame to the report point coordinates in the current frame is greater than a preset threshold $dist_i^0$, and an axis change value is greater than the preset threshold $dist_i^0$, the report point flicking is suppressed. Herein, the axis change value is the overall change $axisChange_i$ of the major axis and the minor axis. i represents the current frame, and i is a positive integer greater than 1.

Optionally, in still another embodiment of the present invention, the terminal may alternatively determine the flicking distance $move_i^0$ determine whether to suppress the report point flicking.

In an embodiment, the flicking distance may be a distance between the report point coordinates in the previous frame and the report point coordinates in the current frame, and when the flicking distance meets a preset condition, the report point coordinates in the previous frame are used as the report point coordinates in the current frame.

In another embodiment, the flicking distance $move_i^0$ may alternatively be obtained by subtracting an unintentional flicking distance $unnormalDist_i$ from a distance between report point coordinates in the first frame and the report point coordinates in the current frame. The unintentional flicking distance $unnormalDist_i$ is a sum of all unintentional flicking distances from the first frame to the current frame.

For example, when the flicking distance $move_i^0$ is less than a threshold, the report point flicking is suppressed.

For another example, when the flicking distance $move_i^0$ is less than a threshold, and the report point is in the CLICK state, the report point flicking is controlled.

Optionally, in yet another embodiment of the present invention, the terminal may alternatively control the report point coordinates in the current frame to be the report point coordinates in the previous frame based on a first capacitance signal change value, a second capacitance signal change value, and a third signal change value. Herein, the first capacitance signal change value may be n1 in S101, the second capacitance signal change value may be n2 in S101, and the third signal change value may be eiff in S101.

For example, when n1 and n2 are both greater than 0, and are greater than thresholds respectively, the report point flicking is suppressed.

For example, when n1 and n2 are both greater than 0, and are less than thresholds respectively, the report point flicking is suppressed.

For another example, when n1 is greater than 0, n2 is less than 0, and a value of eiff is relatively large, in other words, when n1 is greater than 0, n2 is less than 0, and the value of eiff is greater than a threshold, the report point flicking is suppressed.

For still another example, when the absolute values of n1 and n2 are both very small, and the absolute values of n1 and n2 are each less than a threshold, or the absolute values of n1 and n2 are both less than a threshold, the report point flicking is suppressed.

It should be noted that in this embodiment of the present invention, the threshold may be set based on a requirement, and a specific value is not limited in this embodiment of the present invention.

Optionally, in this embodiment of the present invention, whether to suppress the report point flicking may be further determined based on n1, n2, eiff, and the ratio (ratio). The ratio is the ratio of the displacement of the gravity center of the capacitance bright spot to the movement distance of the gravity center of the capacitance bright spot in the specific time period.

For example, the report point flicking is suppressed when two adjacent frames meet the following conditions:
eiff is greater than a fixed threshold EIFF_TH;
n1 is greater than 0, n2 is less than 0, and the absolute values of n1 and n2 are both less than a preset threshold N_TH; and
a smaller ratio indicates a smaller ratio of the displacement from the report point coordinates in the previous frame to the report point coordinates in the current frame to the flicking length of the finger of the user on the terminal screen.

On the contrary, when the following conditions are met, an operation is determined as a flick operation, and the report point flicking is controlled:
the report point coordinates in the current frame change relative to the report point coordinates in the previous frame;
eiff is less than a fixed threshold EIFF_TH;
n1 is greater than 0, n2 is less than 0, and the absolute values of n1 and n2 are both greater than a preset threshold N_TH; and
a smaller ratio indicates a larger ratio of displacement from the report point coordinates in the current frame to a report point coordinates in the next frame to the flicking length of the finger of the user on the terminal screen. For example, one of the following cases is met:

A. Ratio <0.2, and the displacement of the report point between the current frame and the next frame is greater than a half of a length of the finger in a flicking direction.

B. 0.2≤ratio≤0.7, and the displacement of the report point between the current frame and the next frame is greater than one fifth of a length of the finger in the flicking direction.

C. Ratio>0.7, and the displacement of the report point between the current frame and the next frame is greater than a ratio of an upper limit value WINDOW_SIZE of a length of the capacitance bright spot sequence in actual calculation to a quantity of bright spots used in actual ratio calculation.

Optionally, in this embodiment of the present invention, the terminal may alternatively determine, based on capacitance signals in two non-adjacent frames, whether to suppress or flick the report point. First, the terminal maintains a capacitance bright spot queue. The queue needs to satisfy that a change between capacitance bright spots in the first frame and the last frame is not significant. Herein, "not significant" means that absolute values of n1 and n2 between the two capacitance bright spots are less than a fixed threshold N_SIG_TH. Because a capacitive touchscreen of the terminal reports the capacitance signal of the entire terminal screen at a high frequency, and a change of a capacitance bright spot between frames is not very significant, it may be approximately considered that a change of a capacitance bright spot at the end of the queue relative to any capacitance bright spot in the queue is not very significant. If a new capacitance bright spot is added to the queue, a capacitance bright spot at the head of the queue leaves the queue until a change between a capacitance bright spot at the head of the queue and a capacitance bright spot at the end of the queue is not significant. If each capacitance bright spot leaving the queue and a capacitance bright spot currently at the end of the queue meet the following conditions, the report point flicks; otherwise, the report point flicking is suppressed. Possible conditions include:

1. A change between each capacitance bright spot leaving the queue and the capacitance bright spot currently at the end of the queue is significant, that is, the absolute value of n1 is greater than or equal to N_SIG_TH, and the absolute value of n2 is greater than or equal to N_SIG_TH.

2. The report point coordinates corresponding to the capacitance bright spot in the current frame change relative to the report point coordinates corresponding to the capacitance bright spot in the previous frame.

3. eiff between the two frames is less than a fixed threshold EIFF_CROSS_TH.

4. Between the two frames, n1 is greater than n2, n1 is greater than 0, n2 is less than 0, and the absolute value of n1 is greater than MULT_TH× the absolute value of n2.

Figure 5A:
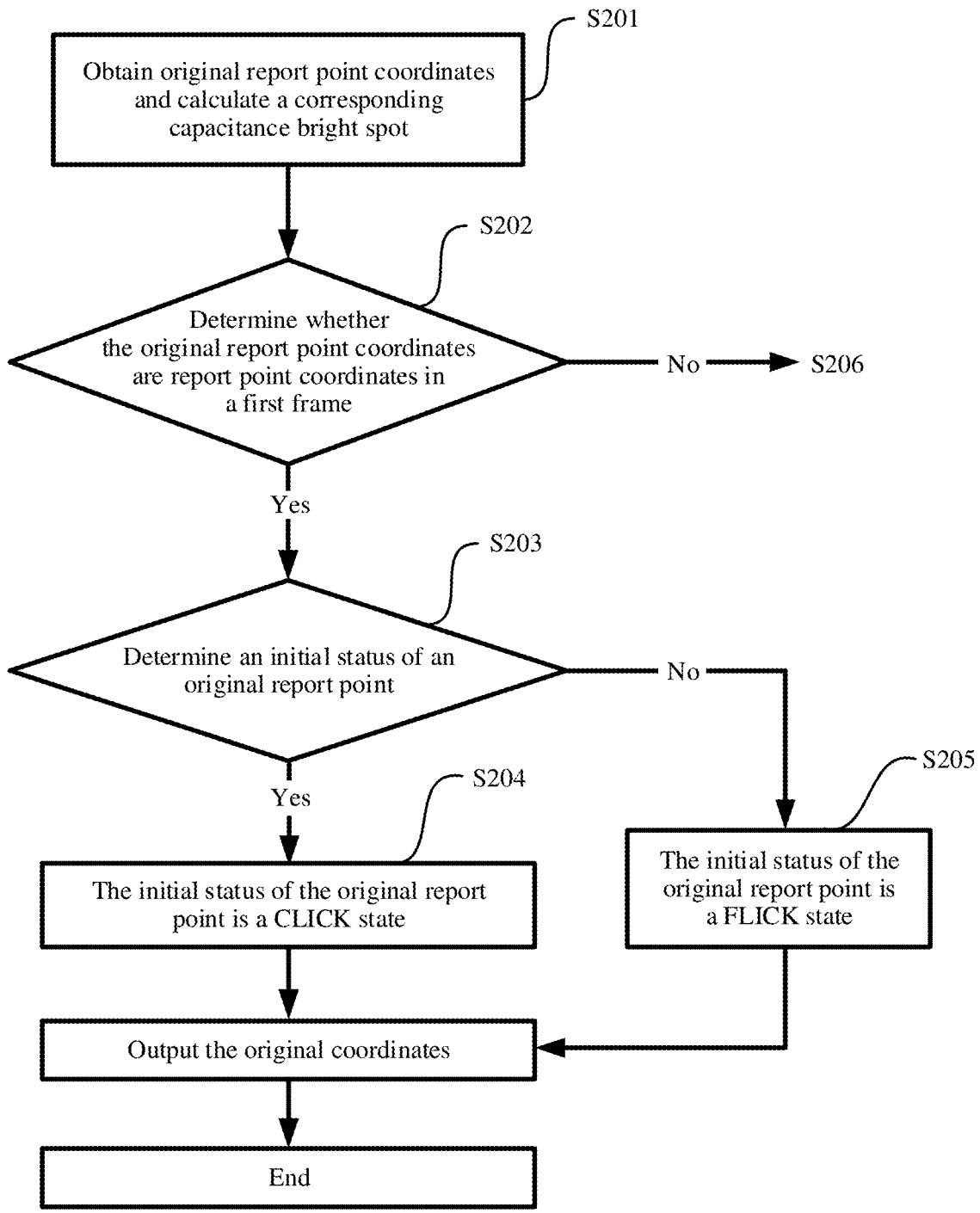
Figure 5B:
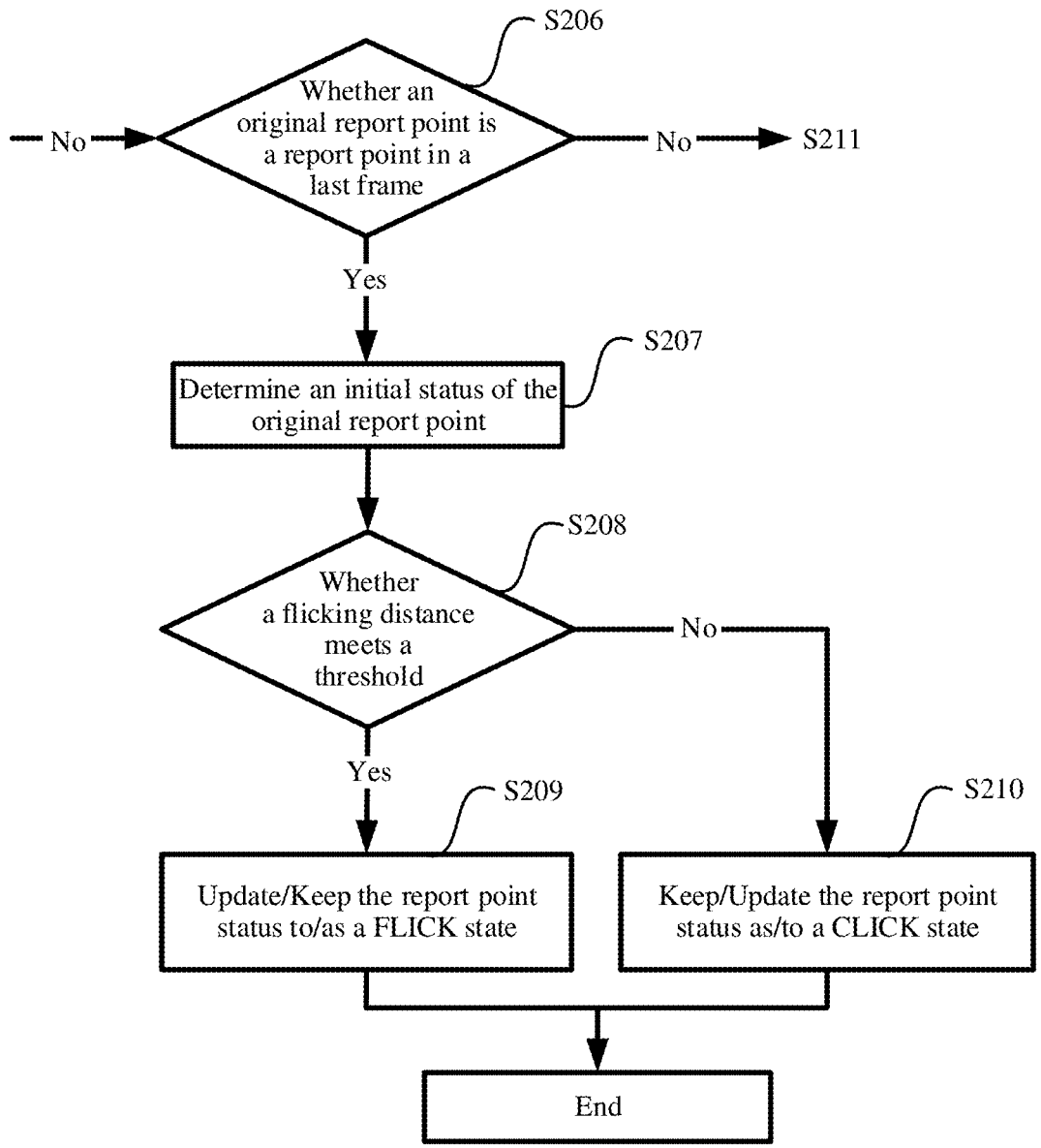
Figures 1, 5C:
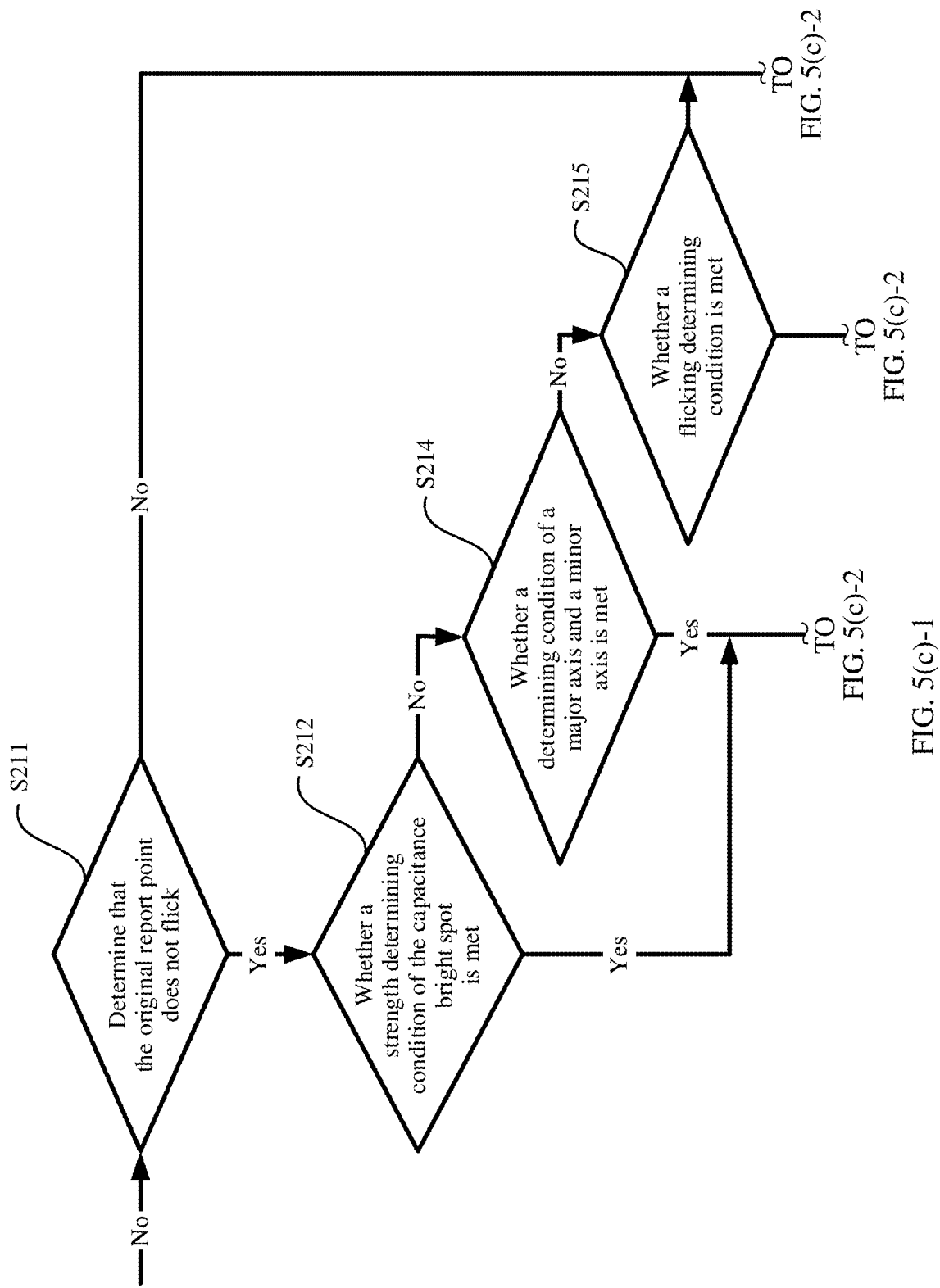
Figures 2, 5C:
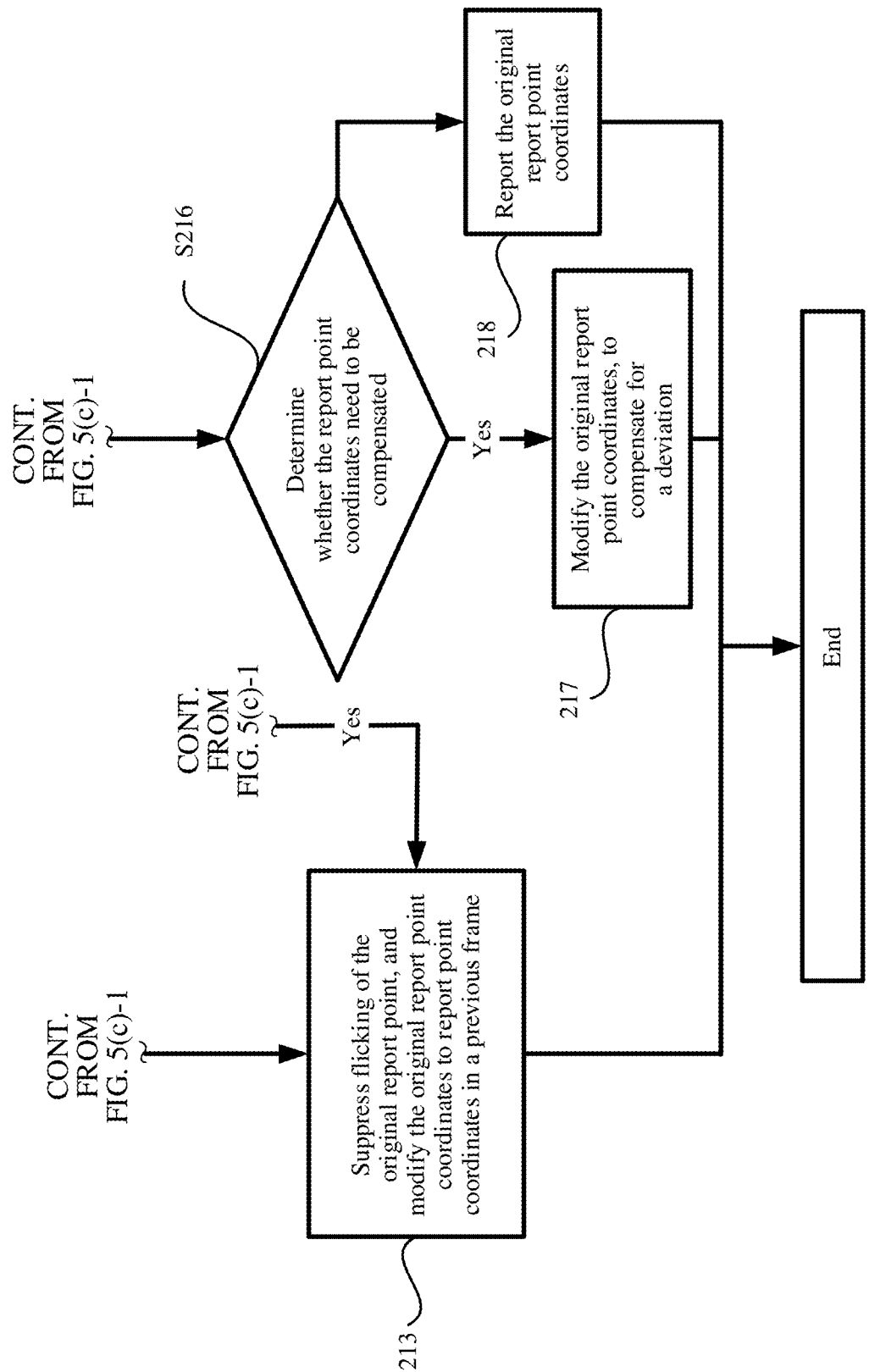
Figures 1, 6A:
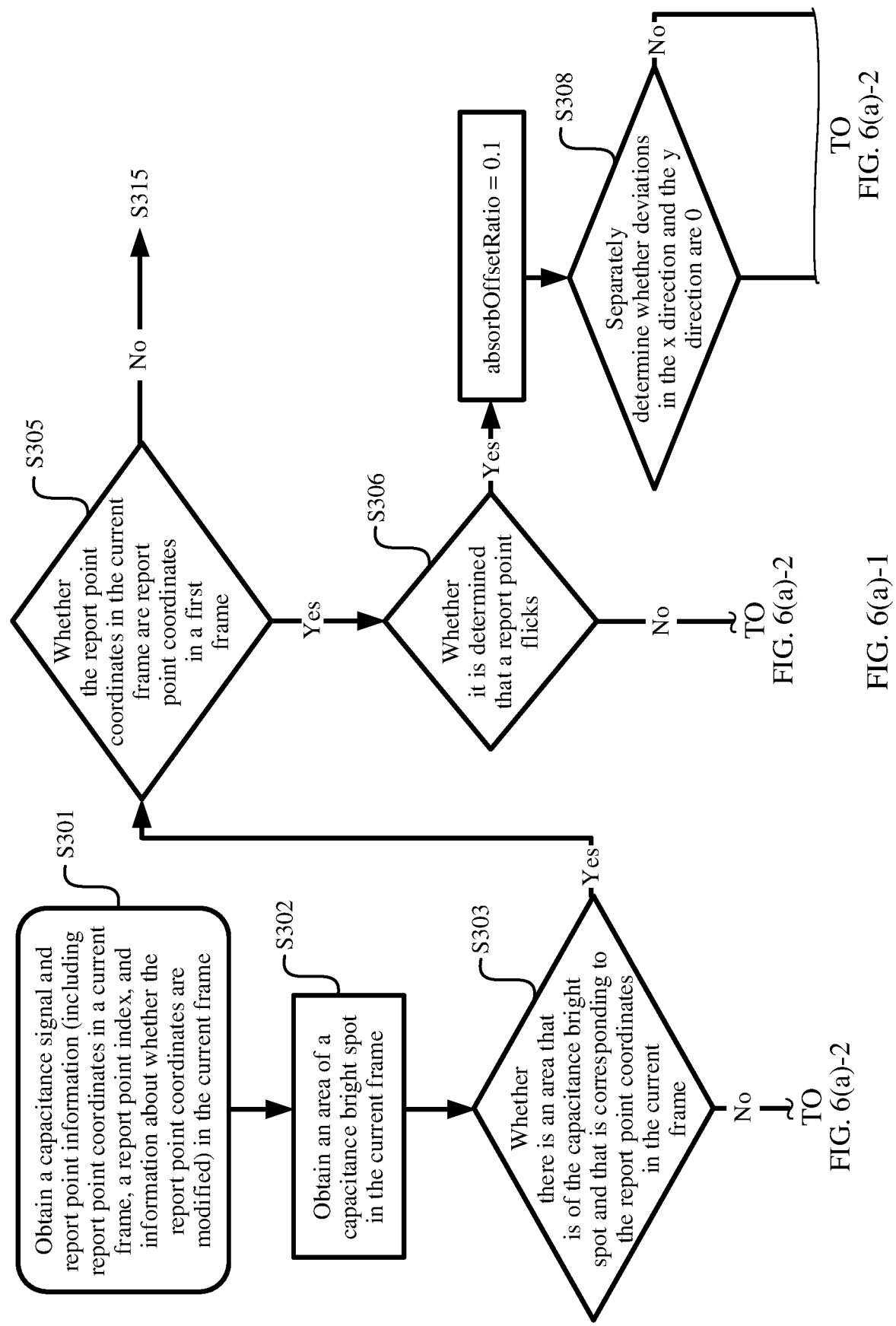
Figures 1, 6B:
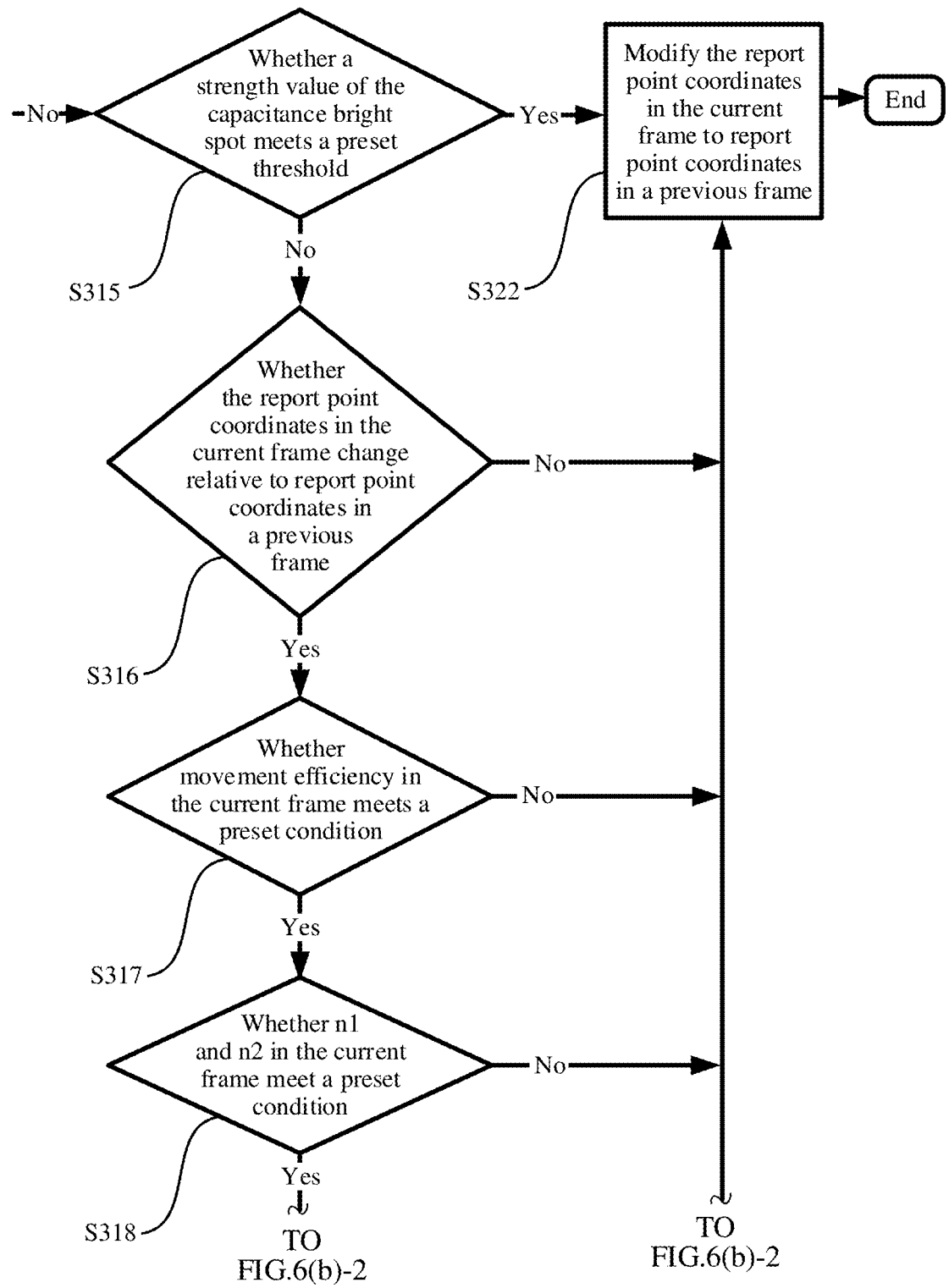
Figures 2, 6B:
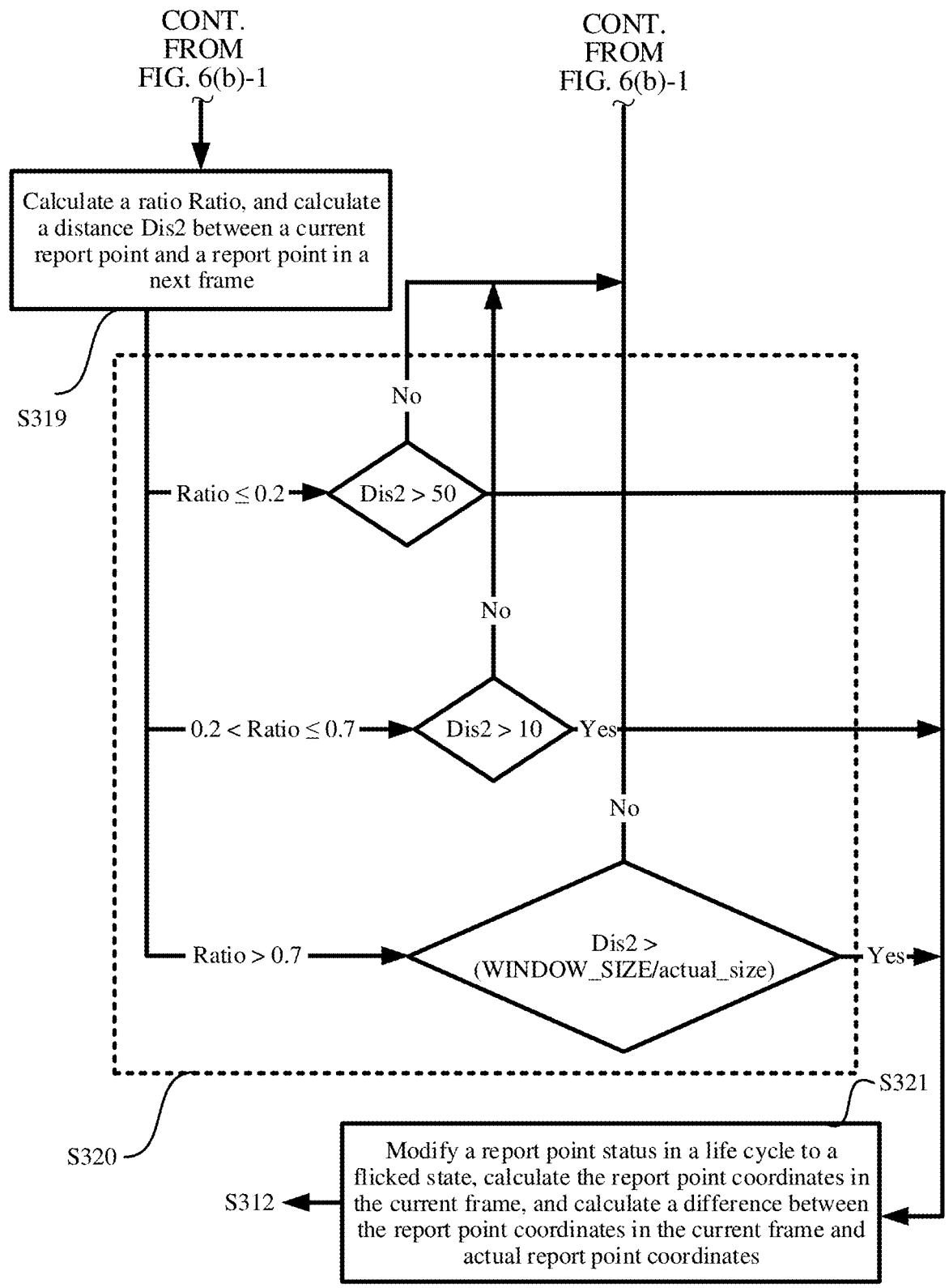

The following describes processes of the technical solutions of the embodiments of the present invention with reference to FIG. 5(*a*), FIG. 5(*b*), FIG. 5(*c*)-1 and FIG. 5(*c*)-2, and FIG. 6.

FIG. 5(*a*), FIG. 5(*b*), and FIG. 5(*c*)-1 and FIG. 5(*c*)-2 are a flowchart of a method for determining whether a report point flicks according to an embodiment of the present invention. FIG. 6 is a flowchart of another method for determining whether a report point flicks according to an embodiment of the present invention.

As shown in FIG. 5(*a*), the method may include the following steps.

S201. Obtain original report point coordinates and calculate a corresponding capacitance bright spot.

When a user performs an operation on a terminal screen, in other words, when the user enters operation information, capacitance signals and report point coordinates in a plurality of consecutive frames are generated. The terminal obtains the original report point coordinates of an entered touch (touch) event. Herein, the original report point coordinates may be considered as report point coordinates in any frame in the report point coordinates in the plurality of frames. In addition, the capacitance bright spot is calculated based on the capacitance signals generated when the user performs the operation on the terminal screen.

S202. Determine whether the original report point coordinates are report point coordinates in a first frame.

The report point coordinates in the first frame are generated at the very beginning of tapping the terminal screen in a process in which the user completes one-time interaction with the terminal screen, in other words, are report point coordinates of initially tapping the terminal screen.

When the original report point coordinates are the report point coordinates in the first frame, S203 is performed; otherwise, S206 is performed.

S203. Determine an initial status of an original report point.

In this embodiment of the present invention, in the process in which the user completes the one-time interaction with the terminal screen, if the initial status of the report point is a CLICK state, when determining that the user performs intentional flicking and a flicking distance exceeds a preset threshold, the terminal switches the status of the report point to a FLICK state. A final status of the report point of completing the one-time interaction is used as an initial status of a report point in next interaction. In other words, when the current interaction is finally completed, the FLICK state of the report point when the user lifts a finger from the terminal screen is used as the initial status of the report point in the next interaction. If the initial status of the report point is the FLICK state, but after the user lifts the finger from the terminal screen, the terminal determines that the intentional flicking distance of the user is less than the preset threshold, the terminal switches the report point status to the CLICK state in a process in which the user lifts the finger from the terminal screen, and the CLICK state of the report point is used as the initial status of the report point in the next interaction.

The status of the report point is switched at most once during the process in which the user completes the one-time interaction with the terminal screen.

S204. Output the original report point coordinates when the initial status of the original report point is the CLICK state.

S205. Output the original report point coordinates when the initial status of the original report point is the FLICK state.

Optionally, in this embodiment of the present invention, when determining that the original report point coordinates are the report point coordinates in the first frame, the terminal may directly output the original report point coordinates without switching the status of the report point.

As shown in FIG. 5(*b*), in S206, whether the original report point coordinates are report point coordinates in a last frame is determined.

In this embodiment of the present invention, if the original report point coordinates are the report point coordinates in the last frame, S207 is performed; otherwise, S211 is performed.

S207. Determine an initial status of an original report point.

The initial status of the original report point has two types: 1. a CLICK state; and 2. a FLICK state.

S208. Determine whether a flicking distance meets a preset threshold.

When the initial status of the original report point is the CLICK state, and the flicking distance meets the preset threshold, S209 is performed: updating the report point status to the FLICK state. When the initial status of the original report point is the FLICK state, and the flicking distance does not meet the preset threshold, S210 is performed: keeping the initial CLICK state of the report point.

When the initial status of the original report point is the FLICK state, and the flicking distance meets the preset threshold, S209 is performed: keeping the initial FLICK state of the report point. When the initial status of the original report point is the FLICK state, and the flicking distance does not meet the preset threshold, S210 is performed: updating the initial status of the report point to the CLICK state.

Herein, the flicking distance may be a flicking distance between the original report point and a report point in a previous frame, or may be a flicking distance between the original report point and a report point in a non-adjacent frame.

As shown in FIG. 5(c)-1 and FIG. 5(c)-2, in S211, whether the original report point flicks is determined.

When it is determined that the original report point does not flick, S212 is performed; otherwise, S216 is performed.

S212. Determine whether a strength determining condition of the capacitance bright spot is met.

Herein, the strength determining condition of the capacitance bright spot may be as follows:

A peak ratio $PeakRatio_i$ is less than a threshold, and a maximum value $SquareSum_i$ in sums of strength values of the capacitance bright spot is less than a threshold, or a maximum value $Peak_i$ of the capacitance bright spot is less than a threshold.

Alternatively, a peak ratio $PeakRatio_i$ is less than a threshold, a maximum value $SquareSum_i$ in sums of strength values of the capacitance bright spot is less than a threshold, a maximum value $Peak_i$ of the capacitance bright spot is less than a threshold, and the report point is in the CLICK state.

Definitions of the peak ratio $PeakRatio_i$, the maximum value $SquareSum_i$ in the sums of the strength values of the capacitance bright spot, and the maximum value $Peak_i$ of the capacitance bright spot are the same as those in S101 or S102. For brevity, details are not described herein again.

When the strength determining condition of the capacitance bright spot is met, S213 is performed; otherwise, S214 is performed.

S213. Suppress flicking of the original report point, and modify the original report point coordinates to report point coordinates in the previous frame.

S214. Determine whether a determining condition of a major axis and a minor axis is met.

Herein, the determining condition of the major axis and the minor axis may be as follows:

Displacement from the report point coordinates in the previous frame to report point coordinates in a current frame is greater than a preset threshold $dist_i^0$, and an axis change value is greater than the preset threshold $dist_i^0$. Herein, the axis change value is an overall change $axisChange_i$ of the major axis and the minor axis. i represents the current frame, and i is a positive integer greater than 1.

When the determining condition of the major axis and the minor axis is met, S213 is performed; otherwise, S215 is performed.

S215. Determine whether a flicking determining condition is met.

Herein, the flicking determining condition is as follows:

A flicking distance $move_i^0$ is less than a threshold; or a flicking distance $move_i^0$ is less than a threshold, and the report point is in the CLICK state.

A definition of the flicking distance $move_i^0$ is the same as that in S101 or S102. For brevity, details are not described herein again.

When the flicking determining condition is met, S213 is performed; otherwise, it is determined that the report point flicks, and S216 is performed.

S216. Determine whether the report point coordinates need to be compensated.

When the user performs a flick operation, the terminal cannot ensure that the terminal determines, at the beginning of flicking, that the flicking is a result of an intentional operation of the user. Therefore, the terminal may suppress report point flicking in first i frames after starting to report the report point, and stop suppressing after an $i^{th}$ frame. Therefore, to avoid a visual "jumping" effect of the report point that is brought to the user in a flicking process, the terminal may compensate and modify the original report point coordinates in several frames after the $i^{th}$ frame, instead of directly reporting the original report point coordinates of a system after the $i^{th}$ frame, until a deviation caused by suppressing the flicking is completely compensated.

When the report point coordinates need to be compensated, S217 is performed; otherwise, S218 is performed.

S217. Modify the original report point coordinates, to compensate for the deviation.

S218. Report the original report point coordinates.

In this embodiment of the present invention, if it is determined in S216 that the report point coordinates need to be compensated, optionally, the report point coordinates may be compensated in the following manner.

It is assumed that original report point coordinates in the $i^{th}$ frame are $P_i^0$, an original report point in an $(i+1)^{th}$ frame is $P_{i+1}^0$, compensated report point coordinates in the $i^{th}$ frame are $P_i^c$, (dx, dy) is a value of a deviation of the original report point in the $i^{th}$ frame from an actual report point, compensated report point coordinates in the $(i+1)^{th}$ frame are $P_{i+1}^c$, and (dx−stepX, dy−stepY) is a value of a deviation of the original report point in the $(i+1)^{th}$ frame from an actual report point. (stepX, stepY) is used for compensation in each of several frames after the compensation starts, to completely compensate for the deviation generated by suppressing the flicking. After the compensation is completed, the compensated original report point coordinates are reported. In this way, the visual "jumping" effect caused by a change from report point flicking suppression to report point flicking is avoided. To be specific, $$P_i^0=(x_i^0,y_i^0),$$

$$P_{i+1}^0=(x_{i+1}^0,y_{i+1}^0)=(x_i^0+\Delta x,y_i^0+\Delta y),$$

$$P_i^c=(x_i^c,y_i^c)=(x_i^0-dx,y_i^0-dy), \text{ and}$$

$$P_{i+1}^c=(x_{i+1}^c,y_{i+1}^c)=(x_i^0-dx+\Delta x+stepX,y_i^0-dyt+\Delta y+stepY).$$

FIG. 6(a)-1 and FIG. 6(a)-2 and FIG. 6(b)-1 and FIG. 6(b)-2 are a flowchart of another method for determining whether a report point flicks according to an embodiment of the present invention. As shown in FIG. 6(a)-1 and FIG. 6(a)-2, the method may include the following steps.

S301. Obtain a capacitance signal and report point information in a current frame.

The report point information includes report point coordinates and a report point index (pointIndex) of a report point in the current frame, and information about whether the report point coordinates need to be modified.

S302. Obtain an area of a capacitance bright spot in the current frame.

S303. Determine whether there is an area that is of the capacitance bright spot and that is corresponding to the report point coordinates in the current frame.

If there is no area that is of the capacitance bright spot and that is corresponding to the report point coordinates in the current frame, S304 is performed; otherwise, S305 is performed.

S304. Report the report point coordinates in the current frame.

S305. Determine whether the report point coordinates in the current frame are report point coordinates in a first frame.

If the report point coordinates in the current frame are the report point coordinates in the first frame, S306 is performed; otherwise, S315 is performed.

S306. Determine whether it is determined that the report point flicks.

If it is determined that the report point does not flick, S307 is performed; otherwise, S308 is performed.

S307. Report the report point coordinates in the current frame, and store the report point coordinates in the current frame in a last report X (lastReportX) and a last report Y (lastReportY).

In this embodiment of the present invention, it is assumed that absorbOffsetRatio=0.1. When absorbOffsetRatio=0.1, S308 is performed.

S308. Separately determine whether deviations in the x direction and the y direction are 0.

If the deviations in the x direction and the y direction each are 0, S309 is separately performed; otherwise, S314 is separately performed.

It should be noted that, in this embodiment of the present invention, in S308 to S314, processing methods in the x direction and the y direction are the same, but need to be separately performed, and are independent of each other. Alternatively, S308 to S314 in the x direction or S308 to S314 in the y direction may be first performed, or S308 to S314 in the x direction and S308 to S314 in the y direction are simultaneously performed.

S309. Calculate a movement distance xMoveBetween between two adjacent frames in the x direction and a movement distance yMoveBetween between the two adjacent frames in the y direction.

S310. Determine whether an offset in the x direction is less than absorbOffsetRatio×xMoveBetween, and whether an offset in the y direction is less than absorbOffsetRatio×yMoveBetween.

Herein, the offset is a compensated report point coordinates $P_i^c$ in the current frame. The report point in the current frame is $P_i^0$, i represents the current frame, and i is a positive integer greater than 1. For description of report point compensation, refer to the following.

When the offset in the x direction is not less than absorbOffsetRatio × xMoveBetween, or when the offset in the y direction is not less than absorbOffsetRatio × yMoveBetween, S311 is performed; otherwise, S313 is performed.

S311. Adjust the report point coordinates in the current frame, to ensure that the offset in the x direction offset=absorbOffsetRatio×xMoveBetween, and that the offset in the y direction offset=absorbOffsetRatio×yMoveBetween.

S312. Store a report point coordinates in the current frame in a last report X (lastReportX) and a last report Y (lastReportY).

S313. Report actual report point coordinates in the current frame, set the offset offsetX in the x direction to 0, and set the offset offsetY in the y direction to 0.

S314. Separately set the x direction and the y direction as actual coordinate values of the actual report point coordinates in the current frame in the x direction and the y direction.

As shown in FIG. 6(b)-1 and FIG. 6(b)-2, in S315, whether a strength value of the capacitance bright spot meets a preset threshold is determined.

When the strength value of the capacitance bright spot meets the preset threshold, S316 is performed; or if the strength value of the capacitance bright spot is very small and is less than the preset threshold, S322 is performed.

S316. Determine whether the report point coordinates in the current frame change relative to report point coordinates in a previous frame.

When the report point coordinates in the current frame change relative to the report point coordinates in the previous frame, S317 is performed; otherwise, S322 is performed.

S317. Determine whether movement efficiency in the current frame meets a preset condition.

Herein, the movement efficiency is eiff described in S101 or S102. For brief, details are not described herein again.

In this embodiment of the present invention, a condition that the movement efficiency meets may be: eiff is less than a fixed threshold EIFF_TH.

When the movement efficiency meets the preset condition, S318 is performed; otherwise, S322 is performed.

S318. Determine whether n1 and n2 in the current frame meet a preset condition.

Herein, definitions of n1 and n2 are the same as those in S101 or S102. For brief, details are not described herein again.

In this embodiment of the present invention, a condition that n1 and n2 meet may be: n1 is greater than 0, n2 is less than 0, and absolute values of n1 and n2 are both greater than a preset threshold N_TH.

When the preset condition is met, S319 is performed; otherwise, S320 is performed.

S319. Calculate a ratio, and calculate a distance Dis2 between a current report point and a report point in a next frame.

The ratio is the same as the ratio Ratio defined in S102, and the ratio is a ratio of displacement from a gravity center of the capacitance bright spot in the current frame to a gravity center of a capacitance bright spot in the previous frame to a movement distance between the gravity center of the capacitance bright spot in the current frame and the gravity center of the capacitance bright spot in the previous frame.

S320. Determine whether the ratio and Dis2 meet a preset condition.

In this embodiment of the present invention, the preset condition may include:
1. Ratio<0.2, and Dis2>50.
2. 0.2≤ratio≤0.7, and Dis2>10.
3. Ratio>0.7, and Dis2>an upper limit value WINDOW_SIZE of a length of a bright spot sequence in actual calculation, or Dis2>a quantity actually_size of bright spot sequences used in actual ratio calculation.

In this embodiment of the present invention, Dis2 may be in a unit of pixel.

The foregoing three conditions each may be used as a condition for determining whether the ratio and Dis2 meet the preset condition. When the ratio and Dis2 meet the preset condition, S321 is performed. When the ratio and Dis2 do not meet the preset condition, S322 is performed.

S321. Modify a report point status in a life cycle to a flicked state, calculate the report point coordinates in the current frame, and calculate a difference between the report point coordinates in the current frame and actual report point coordinates.

Then, S312 is performed.

S322. Modify the report point coordinates in the current frame to the report point coordinates in the previous frame.

In other words, report point flicking is suppressed.

In this embodiment of the present invention, if the preset condition is met in S320, it is determined that a flick operation is performed, and after S321 is performed, compensation is performed on report point coordinates in several frames existing after report point flicking suppression stops. Optionally, the following compensation method may be used for compensation.

It is assumed that original report point coordinates in an $i^{th}$ frame are $P_i^0$, an original report point in an $(i+1)^{th}$ frame is $P_{i+1}^0$, compensated report point coordinates in the $i^{th}$ frame are $P_i^c$, (dx, dy) is a value of a deviation of an original report point in the $i^{th}$ frame from an actual report point, compensated report point coordinates in the $(i+1)^{th}$ frame are $P_{i+1}^c$, and (dx−offsetRatio*Δx, dy−offsetRatio*Δy) is a value of a deviation of an original report point in the $(i+1)^{th}$ frame from an actual report point. (offsetRatio*Δx, offsetRatio*Δy) is used for compensation in each of several frames after the compensation starts, to completely compensate for the deviation generated by suppressing the flicking. After the compensation is completed, compensated original coordinates are reported. In this way, a visual "jumping" effect caused by a change from report point flicking suppression to report point flicking is avoided. To be specific, $$P_i^0=(x_i^0,y_i^0),$$

$$P_{i+1}^0=(x_{i+1}^0,y_{i+1}^0)=(x_i^0+\Delta x,y_i^0+\Delta y),$$

$$P_i^c=(x_i^c,y_i^c)=(x_i^0-dx,y_i^0-dy), \text{ and}$$

$$P_{i+1}^c=(x_{i+1}^c,y_{i+1}^c)=(x_i^0-dx+\Delta x+\text{offsetRatio}*\Delta x,y_i^0-dy+\Delta y+\text{offsetRatio}*\Delta y).$$

Figure 7:
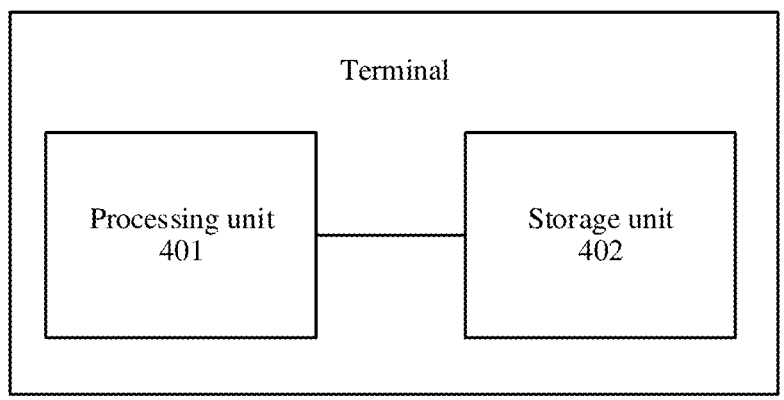
FIG. 7 is a schematic structural diagram of a terminal according to an embodiment of the present invention.

FIG. 7 is a schematic structural diagram of a terminal according to an embodiment of the present invention. As shown in FIG. 7, the terminal may include a processing unit 401 and a storage unit 402. The storage unit 402 is configured to store a capacitance signal generated when a user performs an operation on a terminal screen.

The processing unit 401 is configured to obtain input information, where the input information includes the capacitance signal and report point coordinates that are generated when the user performs the operation on the terminal screen.

The processing unit 401 is further configured to: use report point coordinates in a previous frame as report point coordinates in a current frame if it is determined that a capacitance signal in the current frame and a capacitance signal in the previous frame that are in the input information meet a preset condition; or use report point coordinates in a previous frame as report point coordinates in a current frame if it is determined that the report point coordinates in the current frame and the report point coordinates in the previous frame that are in the input information meet a preset condition, to suppress flicking caused by an unintentional operation of the user. Therefore, user experience is improved.

Optionally, in an embodiment of the present invention, the capacitance signal includes a strength value of a capacitance bright spot, the strength value of the capacitance bright spot is data corresponding to each element in the capacitance bright spot, each element is corresponding to a rectangular area at a corresponding position on the terminal screen, and that the processing unit 401 uses report point coordinates in a previous frame as report point coordinates in a current frame if it is determined that a capacitance signal in the current frame and a capacitance signal in the previous frame that are in the input information meet a preset condition includes:

if it is determined that one or more of a peak ratio, a maximum value in sums of strength values of the capacitance bright spot, and a maximum value of the capacitance bright spot meets/meet a preset condition, the processing unit 401 uses the report point coordinates in the previous frame as the report point coordinates in the current frame; or if it is determined that a peak ratio, a maximum value in sums of strength values of the capacitance bright spot, a maximum value of the capacitance bright spot, and a report point status meet a preset condition, the processing unit 401 uses the report point coordinates in the previous frame as the report point coordinates in the current frame.

The maximum value of the capacitance bright spot is a maximum value in strength values corresponding to a plurality of elements in the capacitance bright spot. The peak ratio is a ratio of a maximum value of a capacitance bright spot in the current frame to a maximum value of a capacitance bright spot in the previous frame. The maximum value in the sums of the strength values of the capacitance bright spot is a maximum value in sums of data that is of four adjacent elements and that includes the maximum value in the strength values of the capacitance bright spot.

Optionally, in this embodiment of the present invention, when each of the one or more of the peak ratio, the maximum value in the sums of the strength values of the capacitance bright spot, and the maximum value of the capacitance bright spot is less than a preset threshold, or when all of the peak ratio, the maximum value in the sums of the strength values of the capacitance bright spot, and the maximum value of the capacitance bright spot are less than corresponding preset thresholds, and a report point is in a tapped state, the report point coordinates in the previous frame are used as the report point coordinates in the current frame.

Optionally, in another embodiment of the present invention, the capacitance signal further includes a major axis value and a minor axis value of a capacitance bright spot, and that the processing unit 401 uses report point coordinates in a previous frame as report point coordinates in a current frame if it is determined that a capacitance signal in the current frame and a capacitance signal in the previous frame that are in the input information meet a preset condition includes:

if it is determined that displacement from the report point coordinates in the previous frame to the report point coordinates in the current frame, and the major axis value and the minor axis value of the capacitance bright spot meet a preset condition, the processing unit 401 uses the report point coordinates in the previous frame as the report point coordinates in the current frame.

Optionally, in this embodiment of the present invention, when the displacement from the report point coordinates in the previous frame to the report point coordinates in the current frame is greater than a preset threshold $dist_i^0$, and an axis change value is greater than the preset threshold $dist_i^0$, the report point coordinates in the previous frame are used as the report point coordinates in the current frame.

i represents the current frame, i is a positive integer greater than 1, and the axis change value meets the following formula:

$$\text{Axis change value} = \sqrt{\begin{array}{l}(\text{Major axis value in a current frame} - \\ \text{Major axis value in a previous frame})^2 + \\ (\text{Minor axis value in the current frame} - \\ \text{Minor axis value in the previous frame})^2\end{array}}.$$

Optionally, in still another embodiment of the present invention, that the processing unit 401 is configured to use report point coordinates in a previous frame as report point coordinates in a current frame if it is determined that the report point coordinates in the current frame and report point coordinates in a first frame that are in the input information meet a preset condition includes:

if it is determined that a flicking distance between the report point coordinates in the previous frame and the report point coordinates in the current frame meets the preset condition, the processing unit 401 uses the report point coordinates in the previous frame as the report point coordinates in the current frame.

The flicking distance is obtained by subtracting an unintentional flicking distance from a distance between the report point coordinates in the previous frame and the report point coordinates in the current frame, and the unintentional flicking distance is a sum of all unintentional flicking distances from the previous frame to the current frame.

Optionally, in this embodiment of the present invention, when the flicking distance between the report point coordinates in the previous frame and the report point coordinates in the current frame is less than a preset threshold, and a report point is in a tapped state, the report point coordinates in the previous frame are used as the report point coordinates in the current frame.

Optionally, in yet another embodiment of the present invention, that the processing unit 401 uses report point coordinates in a previous frame as report point coordinates in a current frame if it is determined that a capacitance signal in the current frame and a capacitance signal in the previous frame that are in the input information meet a preset condition includes:

if it is determined that a first capacitance signal change value, a second capacitance signal change value, and movement efficiency meet a preset condition, the processing unit 401 uses the report point coordinates in the previous frame as the report point coordinates in the current frame; or if it is determined that a first capacitance signal change value, a second capacitance signal change value, movement efficiency, and a ratio meet a preset condition, the processing unit 401 uses the report point coordinates in the previous frame as the report point coordinates in the current frame.

The first capacitance signal change value is a change value of the capacitance signal in the current frame relative to the capacitance signal in the previous frame in a movement direction of a gravity center of a capacitance bright spot, the second capacitance signal change value is a change value of the capacitance signal in the current frame relative to the capacitance signal in the previous frame in a direction opposite to the movement direction of the gravity center of the capacitance bright spot, a third capacitance change value is an overall capacitance signal change value used for movement of the gravity center of the capacitance bright spot, and the ratio is a ratio of displacement of the gravity center of the capacitance bright spot to a movement distance of the gravity center of the capacitance bright spot in a specific time period.

Optionally, in this embodiment of present invention, if it is determined that the first capacitance signal change value, the second capacitance signal change value, and the movement efficiency meet the preset condition, the processing unit 401 uses the report point coordinates in the previous frame as the report point coordinates in the current frame, and the preset condition may include:

both of the first capacitance signal change value and the second capacitance signal change value are greater than zero, and the first capacitance signal change value and the second capacitance signal change value are greater than preset thresholds respectively; or both of the first capacitance signal change value and the second capacitance signal change value are less than zero, and the first capacitance signal change value and the second capacitance signal change value are less than preset thresholds respectively; or the first capacitance signal change value is greater than zero, the second capacitance signal change value is less than zero, and the movement efficiency is greater than a preset threshold; or both of an absolute value of the first capacitance signal change value and an absolute value of the second capacitance signal change value are less than a preset threshold.

Optionally, in an embodiment of present invention, the processing unit 401 is further configured to: when it is determined that the report point coordinates in the current frame are not the report point coordinates in the previous frame, compensate the report point coordinates in the current frame and report point coordinates after the current frame. A visual "jumping" effect brought to the user after report point flicking stops is avoided by compensating the report point, so that user experience is improved.

Optionally, in another embodiment of the present invention, that the processing unit 401 compensates the report point coordinates in the current frame and report point coordinates after the current frame includes:

the processing unit 401 compensates report point coordinates in each frame by using (stepX, stepY) or (offsetRatio x Δx, offsetRatio x Δy), where stepX and offsetRatio x Δx each are a compensation amount of the coordinates in each frame in the x direction, and stepY and offsetRatio x Δy each are a compensation amount in the y direction. A visual "jumping" effect brought to the user after report point flicking stops is avoided by compensating the report point, so that user experience is improved.

Functions of function units of the terminal may be implemented in the steps performed by the terminal in the embodiments shown in FIG. 2, FIG. 5(a), FIG. 5(b), FIG. 5(c)-1 and FIG. 5(c)-2, FIG. 6(a)-1 and FIG. 6(a)-2, and FIG. 6(b)-1 and FIG. 6(b)-2. Therefore, a specific working process of the terminal provided in this embodiment of the present invention is not described herein again.

Figure 8:
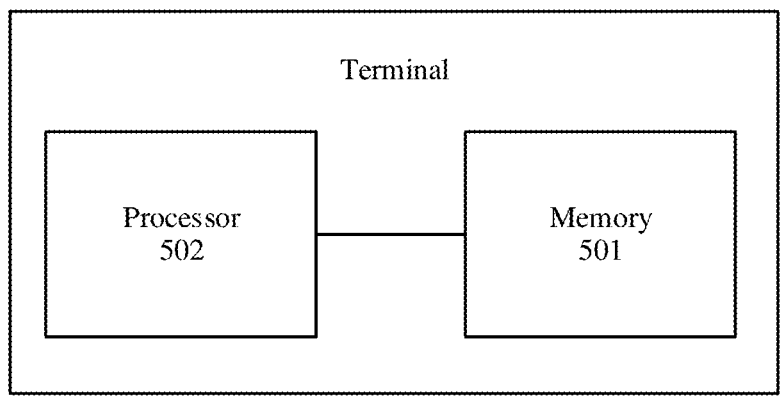
FIG. 8 is a schematic structural diagram of another terminal according to an embodiment of the present invention.

FIG. 8 is a schematic structural diagram of another terminal according to an embodiment of the present invention. The terminal may include a memory 501, a processor 502, and a computer program that is stored in the memory and that can be run on the processor. When the processor executes the program, the following steps are implemented:

obtaining input information, where the input information includes a capacitance signal and report point coordinates that are generated when a user performs an operation on a terminal screen; and using report point coordinates in a previous frame as report point coordinates in a current frame if it is determined that a capacitance signal in the current frame and a capacitance signal in the previous frame that are in the input information meet a preset condition; or using report point coordinates in a previous frame as report point coordinates in a current frame if it is determined that the report point coordinates in the current frame and the report point coordinates in the previous frame that are in the input information meet a preset condition, to suppress flicking caused by an unintentional operation of the user.

Optionally, in an embodiment of the present invention, the capacitance signal includes a strength value of a capacitance bright spot, the strength value of the capacitance bright spot is data corresponding to each element in the capacitance bright spot, each element is corresponding to a rectangular area at a corresponding position on the terminal screen, and that the processor 502 uses report point coordinates in a previous frame as report point coordinates in a current frame if it is determined that a capacitance signal in the current frame and a capacitance signal in the previous frame that are in the input information meet a preset condition includes:

if it is determined that one or more of a peak ratio, a maximum value in sums of strength values of the capacitance bright spot, and a maximum value of the capacitance bright spot meets/meet a preset condition, the processor 502 uses the report point coordinates in the previous frame as the report point coordinates in the current frame; or if it is determined that a peak ratio, a maximum value in sums of strength values of the capacitance bright spot, a maximum value of the capacitance bright spot, and a report point status meet a preset condition, the processor 502 uses the report point coordinates in the previous frame as the report point coordinates in the current frame.

The maximum value of the capacitance bright spot is a maximum value in strength values corresponding to a plurality of elements in the capacitance bright spot. The peak ratio is a ratio of a maximum value of a capacitance bright spot in the current frame to a maximum value of a capacitance bright spot in the previous frame. The maximum value in the sums of the strength values of the capacitance bright spot is a maximum value in sums of data that is of four adjacent elements and that includes the maximum value in the strength values of the capacitance bright spot.

Optionally, in this embodiment of the present invention, when each of the one or more of the peak ratio, the maximum value in the sums of the strength values of the capacitance bright spot, and the maximum value of the capacitance bright spot is less than a preset threshold, or when all of the peak ratio, the maximum value in the sums of the strength values of the capacitance bright spot, and the maximum value of the capacitance bright spot are less than corresponding preset thresholds, and a report point is in a tapped state, the report point coordinates in the previous frame are used as the report point coordinates in the current frame.

Optionally, in another embodiment of the present invention, the capacitance signal further includes a major axis value and a minor axis value of a capacitance bright spot, and that the processor 502 uses report point coordinates in a previous frame as report point coordinates in a current frame if it is determined that a capacitance signal in the current frame and a capacitance signal in the previous frame that are in the input information meet a preset condition includes:

if it is determined that displacement from the report point coordinates in the previous frame to the report point coordinates in the current frame, and the major axis value and the minor axis value of the capacitance bright spot meet a preset condition, the processor 502 uses the report point coordinates in the previous frame as the report point coordinates in the current frame.

Optionally, in this embodiment of the present invention, when the displacement from the report point coordinates in the previous frame to the report point coordinates in the current frame is greater than a preset threshold $dist_i^0$, and an axis change value is greater than the preset threshold $dist_i^0$, the report point coordinates in the previous frame are used as the report point coordinates in the current frame.

i represents the current frame, i is a positive integer greater than 1, and the axis change value meets the following formula:

$$\text{Axis change value} = \sqrt{\begin{array}{l}(\text{Major axis value in a current frame} - \\ \text{Major axis value in a previous frame})^2 + \\ (\text{Minor axis value in the current frame} - \\ \text{Minor axis value in the previous frame})^2\end{array}}.$$

Optionally, in still another embodiment of the present invention, that the processor 502 is configured to use report point coordinates in a previous frame as report point coordinates in a current frame if it is determined that the report point coordinates in the current frame and report point coordinates in a first frame that are in the input information meet a preset condition includes:

if it is determined that a flicking distance between the report point coordinates in the previous frame and the report point coordinates in the current frame meets the preset condition, the processor 502 uses the report point coordinates in the previous frame as the report point coordinates in the current frame.

The flicking distance is obtained by subtracting an unintentional flicking distance from a distance between the report point coordinates in the previous frame and the report point coordinates in the current frame, and the unintentional flicking distance is a sum of all unintentional flicking distances from the previous frame to the current frame.

Optionally, in this embodiment of the present invention, when the flicking distance between the report point coordinates in the previous frame and the report point coordinates in the current frame is less than a preset threshold, and a report point is in a tapped state, the report point coordinates in the previous frame are used as the report point coordinates in the current frame.

Optionally, in yet another embodiment of the present invention, that the processor 502 uses report point coordinates in a previous frame as report point coordinates in a current frame if it is determined that a capacitance signal in the current frame and a capacitance signal in the previous frame that are in the input information meet a preset condition includes:

if it is determined that a first capacitance signal change value, a second capacitance signal change value, and movement efficiency meet a preset condition, the processor 502 uses the report point coordinates in the previous frame as the report point coordinates in the current frame; or if it is determined that a first capacitance signal change value, a second capacitance signal change value, movement efficiency, and a ratio meet a preset condition, the processor 502 uses the report point coordinates in the previous frame as the report point coordinates in the current frame.

The first capacitance signal change value is a change value of the capacitance signal in the current frame relative to the capacitance signal in the previous frame in a movement direction of a gravity center of a capacitance bright spot, the second capacitance signal change value is a change value of the capacitance signal in the current frame relative to the capacitance signal in the previous frame in a direction opposite to the movement direction of the gravity center of the capacitance bright spot, a third capacitance change value is an overall capacitance signal change value used for movement of the gravity center of the capacitance bright spot, and the ratio is a ratio of displacement of the gravity center of the capacitance bright spot to a movement distance of the gravity center of the capacitance bright spot in a specific time period.

Optionally, in this embodiment of the present invention, if it is determined that the first capacitance signal change value, the second capacitance signal change value, and the movement efficiency meet the preset condition, the processor 502 uses the report point coordinates in the previous frame as the report point coordinates in the current frame, and the preset condition includes:

both of the first capacitance signal change value and the second capacitance signal change value are greater than zero, and the first capacitance signal change value and the second capacitance signal change value are greater than preset thresholds respectively; or both of the first capacitance signal change value and the second capacitance signal change value are less than zero, and the first capacitance signal change value and the second capacitance signal change value are less than preset thresholds respectively; or the first capacitance signal change value is greater than zero, the second capacitance signal change value is less than zero, and the movement efficiency is greater than a preset threshold; or both of an absolute value of the first capacitance signal change value and an absolute value of the second capacitance signal change value are less than a preset threshold.

Optionally, in an embodiment of present invention, the processor 502 is further configured to: when it is determined that the report point coordinates in the current frame are not the report point coordinates in the previous frame, compensate the report point coordinates in the current frame and report point coordinates after the current frame. A visual "jumping" effect brought to the user after report point flicking stops is avoided by compensating the report point, so that user experience is improved.

Optionally, in another embodiment of the present invention, that the processor 502 compensates the report point coordinates in the current frame and report point coordinates after the current frame includes:

the processor 502 compensates report point coordinates in each frame by using (stepX, stepY) or (offsetRatio x $\Delta$x, offsetRatio x $\Delta$y), where stepX and offsetRatio x $\Delta$x each are a compensation amount of the coordinates in each frame in the x direction, and stepY and offsetRatio x $\Delta$y each are a compensation amount in the y direction. A visual "jumping" effect brought to the user after report point flicking stops is avoided by compensating the report point, so that user experience is improved.

For problem-resolving implementations of components of the terminal and beneficial effects in the foregoing embodiments, refer to the method implementations and beneficial effects shown in FIG. 2, FIG. 5(a), FIG. 5(b), FIG. 5(c)-1 and FIG. 5(c)-2, FIG. 6(a)-1 and FIG. 6(a)-2, and FIG. 6(b)-1 and FIG. 6(b)-2. Details are not described herein again.

An embodiment of the present invention further provides a computer readable storage medium. The computer readable storage medium includes an instruction. When the instruction is run on a device, the device is enabled to perform the methods shown in FIG. 5(a), FIG. 5(b), FIG. 5(c)-1 and FIG. 5(c)-2, FIG. 6(a)-1 and FIG. 6(a)-2, and FIG. 6(b)-1 and FIG. 6(b)-2.

An embodiment of the present invention further provides a computer program product including an instruction. When the instruction is run on a computer, the computer is enabled to perform the methods shown in FIG. 5(a), FIG. 5(b), FIG. 5(c)-1 and FIG. 5(c)-2, FIG. 6(a)-1 and FIG. 6(a)-2, and FIG. 6(b)-1 and FIG. 6(b)-2.

All or some of the foregoing embodiments of the present invention may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions described in the embodiments of the present invention are generated. The computer may be a general-purpose computer, a dedicated computer, a computer network, or another programmable apparatus. The computer instructions may be stored in a computer readable storage medium or may be transmitted from a computer readable medium to another computer readable medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A control method comprising:
   obtaining input information, wherein the input information comprises a capacitance signal and report point coordinates that are generated based on a user operation on a terminal screen; and
   using report point coordinates in a previous frame as report point coordinates in a current frame if it is determined that a capacitance signal in the current frame and a capacitance signal in the previous frame that are in the input information meet a preset condition; or using report point coordinates in a previous frame as report point coordinates in a current frame if it is determined that the report point coordinates in the current frame and the report point coordinates in the previous frame that are in the input information meet another preset condition;
   wherein the capacitance signal comprises a strength value of a capacitance bright spot, the strength value of the capacitance bright spot is data corresponding to each element in the capacitance bright spot, each element is corresponding to a rectangular area at a corresponding position on the terminal screen, and the using report point coordinates in the previous frame as report point coordinates in the current frame if it is determined that the capacitance signal in the current frame and the capacitance signal in the previous frame that are in the input information meet the preset condition comprises:
   if it is determined that one or more of a peak ratio, a maximum value in sums of strength values of the capacitance bright spot, and a maximum value of the capacitance bright spot meets/meet the preset condition, using the report point coordinates in the previous frame as the report point coordinates in the current frame; or if it is determined that the peak ratio, the maximum value in sums of strength values of the capacitance bright spot, the maximum value of the capacitance bright spot, and a report point status meet the preset condition, using the report point coordinates in the previous frame as the report point coordinates in the current frame, wherein the maximum value of the capacitance bright spot is a maximum value in strength values corresponding to a plurality of elements in the capacitance bright spot, the peak ratio is a ratio of a maximum value of a capacitance bright spot in the current frame to a maximum value of a capacitance bright spot in the previous frame, the maximum value in the sums of the strength values of the capacitance bright spot is a maximum value in sums of data that is corresponding to four adjacent elements and that comprises the maximum value in the strength values of the capacitance bright spot.

2. The control method according to claim 1, wherein when each of the one or more of the peak ratio, the maximum value in the sums of the strength values of the capacitance bright spot, and the maximum value of the capacitance bright spot is less than a preset threshold, or when all of the peak ratio, the maximum value in the sums of the strength values of the capacitance bright spot, and the maximum value of the capacitance bright spot are less than corresponding preset thresholds, and a report point is in a tapped state, the report point coordinates in the previous frame are used as the report point coordinates in the current frame.

3. A non-transitory computer readable storage medium, comprising instructions, wherein when the instructions are run on a device, the device is enabled to perform the method according to claim 1.

4. A control method comprising:
   obtaining input information, wherein the input information comprises a capacitance signal and report point coordinates that are generated based on a user operation on a terminal screen; and
   using report point coordinates in a previous frame as report point coordinates in a current frame if it is determined that a capacitance signal in the current frame and a capacitance signal in the previous frame that are in the input information meet a preset condition; or using report point coordinates in a previous frame as report point coordinates in a current frame if it is determined that the report point coordinated in the current frame and the report point coordinates in the previous frame that are in the input information meet another preset condition;
   wherein the capacitance signal further comprises a major axis value and a minor axis value of a capacitance bright spot, and the using report point coordinates in the previous frame as report point coordinates in the current frame if it is determined that the capacitance signal in the current frame and the capacitance signal in the previous frame that are in the input information meet the preset condition comprises:
   if it is determined that displacement from the report point coordinates in the previous frame to the report point coordinates in the current frame, and the major axis value and the minor axis value of the capacitance bright spot meet the preset condition, using the report point coordinates in the previous frame as the report point coordinates in the current frame.

5. The control method according to claim 4, wherein when the displacement from the report point coordinates in the previous frame to the report point coordinates in the current frame is greater than a preset threshold $dist_i^0$, and an axis change value is greater than the preset threshold $dist_i^0$, the report point coordinates in the previous frame are used as the report point coordinates in the current frame, wherein
   i represents the current frame, i is a positive integer greater than 1, and the axis change value meets the following formula:

$$\text{Axis change value} = \sqrt{\begin{array}{l}(\text{Major axis value in a current frame} - \\ \text{Major axis value in a previous frame})^2 + \\ (\text{Minor axis value in the current frame} - \\ \text{Minor axis value in the previous frame})^2\end{array}}.$$

6. A control method comprising:
   obtaining input information, wherein the input information comprises a capacitance signal and report point coordinates that are generated based on a user operation on a terminal screen; and
   using report point coordinates in a previous frame as report point coordinates in a current frame if it is determined that a capacitance signal in the current frame and a capacitance signal in the previous frame that are in the input information meet a preset condition; or using report point coordinates in a previous frame as report point coordinates in a current frame if it is determined that the report point coordinates in the current frame and the report point coordinates in the previous frame that are in the input information meet another preset condition;

wherein the using report point coordinates in the previous frame as report point coordinates in the current frame if it is determined that the report point coordinates in the current frame and the report point coordinates in the previous frame that are in the input information meet the preset condition comprises:

if it is determined that a flicking distance between the report point coordinates in the previous frame and the report point coordinates in the current frame meets the preset condition, using the report point coordinates in the previous frame as the report point coordinates in the current frame, wherein the flicking distance is obtained by subtracting an unintentional flicking distance from a distance between the report point coordinates in the previous frame and the report point coordinates in the current frame, and the unintentional flicking distance is a sum of all unintentional flicking distances from the previous frame to the current frame.

7. The control method according to claim 6, wherein when the flicking distance between the report point coordinates in the previous frame and the report point coordinates in the current frame is less than a preset threshold, and a report point is in a tapped state, the report point coordinates in the previous frame are used as the report point coordinates in the current frame.

8. A control method comprising:

obtaining input information, wherein the input information comprises a capacitance signal and report point coordinates that are generated based on a user operation on a terminal screen; and using report point coordinate % in a previous frame as report point coordinates in a current frame if it is determined that a capacitance signal in the current frame and a capacitance signal in the previous frame that are in the input information meet a preset condition; or using report point coordinates in a previous frame as port point coordinates in a current frame if it is determined that the report point coordinates in the current frame and the report point coordinates in the previous frame that are in the input information meet another reset condition, wherein the using report point coordinates in the previous frame as report point coordinates in the current frame if it is determined that the capacitance signal in the current frame and the capacitance signal in the previous frame that are in the input information meet the preset condition comprises:

if it is determined that a first capacitance signal change value, a second capacitance signal change value, and movement efficiency meet the preset condition, using the report point coordinates in the previous frame as the report point coordinates in the current frame; or if it is determined that a first capacitance signal change value, a second capacitance signal change value, the movement efficiency, and a ratio meet the preset condition, using the report point coordinates in the previous frame as the report point coordinates in the current frame, wherein the first capacitance signal change value is a change value of the capacitance signal in the current frame relative to the capacitance signal in the previous frame in a movement direction of a gravity center of a capacitance bright spot, the second capacitance signal change value is a change value of the capacitance signal in the current frame relative to the capacitance signal in the previous frame in a direction opposite to the movement direction of the gravity center of the capacitance bright spot, a third capacitance change value is an overall capacitance signal change value used for movement of the gravity center of the capacitance bright spot, and the ratio is a ratio of displacement of the gravity center of the capacitance bright spot to a movement distance of the gravity center of the capacitance bright spot in a specific time period.

9. The control method according to claim 8, wherein if it is determined that the first capacitance signal change value, the second capacitance signal change value, and the movement efficiency meet the preset condition, the report point coordinates in the previous frame are used as the report point coordinates in the current frame, and the preset condition comprises:

both of the first capacitance signal change value and the second capacitance signal change value are greater than zero, and the first capacitance signal change value and the second capacitance signal change value are greater than preset thresholds respectively; or both of the first capacitance signal change value and the second capacitance signal change value are less than zero, and the first capacitance signal change value and the second capacitance signal change value are less than preset thresholds respectively; or the first capacitance signal change value is greater than zero, the second capacitance signal change value is less than zero, and the movement efficiency is greater than a preset threshold; or both of an absolute value of the first capacitance signal change value and an absolute value of the second capacitance signal change value are less than a preset threshold.

10. A control method comprising:

obtaining input information, wherein the input information comprises a capacitance signal and report point coordinates that are generated based on a user operation on a terminal screen;

using report point coordinates in a previous frame as report point coordinates in a current frame if it is determined that a capacitance signal in the current fame and a capacitance signal in the previous frame that are in the input information meet a preset condition; or using report point coordinates in a previous frame as report point coordinates in a current frame if it is determined that the report point coordinates in the current frame and the report point coordinates in the previous frame that are in the input information meet another preset condition; and when it is determined that the report point coordinates in the current frame are not the report point coordinates in the previous frame, compensating the report point coordinates in the current frame and report point coordinates after the current frame.

11. The control method according to claim 10, wherein the compensating the report point coordinates in the current frame and report point coordinates after the current frame comprises:

compensating report point coordinates in each frame by using (stepX, stepY) or (offsetRatio x $\Delta$x, offsetRatio x $\Delta$y), wherein stepX and offsetRatio x $\Delta$x each are a compensation amount of the coordinates in each frame in the x direction, and stepY and offsetRatio x $\Delta$y each are a compensation amount in the y direction.

12. A terminal comprising: a memory, a processor, and a computer program that is stored in the memory and that can be executed on the processor such that the terminal is configured to implement at least the following steps:

obtaining input information, wherein the input information comprises a capacitance signal and report point coordinates that are generated based on a user operation on a terminal screen; and using report point coordinates in a previous frame as report point coordinates in a current frame if it is determined that a capacitance signal in the current fame and a capacitance signal in the previous frame that are in the input information meet a preset condition; or using report point coordinates in a previous frame as report pint coordinates in a current frame if it is determined that the report pint coordinates in the current frame and the report point coordinates in the previous frame that arm in the input information meet another preset condition;

wherein the capacitance signal comprises a strength value of a capacitance bright spot, the strength value of the capacitance bright spot is data corresponding to each element in the capacitance bright spot, each element is corresponding to a rectangular area at a corresponding position on the terminal screen, and that the processor uses report point coordinates in the previous frame as report point coordinates in the current frame if it is determined that the capacitance signal in the current frame and the capacitance signal in the previous frame that are in the input information meet the preset condition comprises:

if it is determined that one or more of a peak ratio, a maximum value in sums of strength values of the capacitance bright spot, and a maximum value of the capacitance bright spot meets/meet the preset condition, the processor uses the report point coordinates in the previous frame as the report point coordinates in the current frame; or if it is determined that the peak ratio, the maximum value in sums of strength values of the capacitance bright spot, the maximum value of the capacitance bright spot, and a report point status meet the preset condition, the processor uses the report point coordinates in the previous frame as the report point coordinates in the current frame, wherein the maximum value of the capacitance bright spot is a maximum value in strength values corresponding to a plurality of elements in the capacitance bright spot, the peak ratio is a ratio of a maximum value of a capacitance bright spot in the current frame to a maximum value of a capacitance bright spot in the previous frame, the maximum value in the sums of the strength values of the capacitance bright spot is a maximum value in sums of data that is of four adjacent elements and that comprises the maximum value in the strength values of the capacitance bright spot.

13. The terminal according to claim 12, wherein when each of the one or more of the peak ratio, the maximum value in the sums of the strength values of the capacitance bright spot, and the maximum value of the capacitance bright spot is less than a preset threshold, or when all of the peak ratio, the maximum value in the sums of the strength values of the capacitance bright spot, and the maximum value of the capacitance bright spot are less than corresponding preset thresholds, and a report point is in a tapped state, the report point coordinates in the previous frame are used as the report point coordinates in the current frame.

14. A terminal comprising: a memory, a processor, and a computer program that is stored in the memory and that can be executed on the processor such that the terminal is configured to implement at least the following steps:

obtaining input information, wherein the input information comprises a capacitance signal and report point coordinates that are generated based on a user operation on a terminal screen; and using report point coordinates in a previous frame as report point coordinate: in a current frame if it is determined that a capacitance signal in the current frame and a capacitance signal in the previous frame that are in the input information meet a preset condition; or using report point coordinates in a previous frame as report point coordinates in a current frame if it is determined that the report point coordinates in the current frame and the report point coordinates in the previous frame that are in the input information meet another preset condition;

wherein the capacitance signal further comprises a major axis value and a minor axis value of a capacitance bright spot, and that the processor uses report point coordinates in the previous frame as report point coordinates in the current frame if it is determined that the capacitance signal in the current frame and the capacitance signal in the previous frame that are in the input information meet the preset condition comprises:

if it is determined that displacement from the report point coordinates in the previous frame to the report point coordinates in the current frame, and the major axis value and the minor axis value of the capacitance bright spot meet the preset condition, the processor uses the report point coordinates in the previous frame as the report point coordinates in the current frame.

15. The terminal according to claim 14, wherein when the displacement from the report point coordinates in the previous frame to the report point coordinates in the current frame is greater than a preset threshold $dist^i_0$, and an axis change value is greater than the preset threshold $dist^i_0$, the report point coordinates in the previous frame are used as the report point coordinates in the current frame, wherein i represents the current frame, i is a positive integer greater than 1, and the axis change value meets the following formula:

$$\text{Axis change value} = \sqrt{\begin{array}{l}(\text{Major axis value in a current frame} - \\ \text{Major axis value in a previous frame})^2 + \\ (\text{Minor axis value in the current frame} - \\ \text{Minor axis value in the previous frame})^2\end{array}}.$$

16. A terminal comprising: a memory, a processor, and a computer program that is stored in the memory and that can be executed on the processor such that the terminal is configured to implement at least the following steps:

obtaining input information, wherein the input information comprises a capacitance signal and report point coordinates that are generated based on a user operation on a terminal screen; and using report point coordinates in a previous frame as report point coordinates in a current frame if it is determined that a capacitance signal in the current frame and a capacitance signal in the previous frame that are in the input information meet a preset condition; or using report point coordinates in a previous frame as report point coordinates in a current frame if it is determined that the report point coordinates in the current frame and the report point coordinates in the previous frame that are in the input information meet another preset condition;

wherein that the processor is configured to use report point coordinates in the previous frame as report point coordinates in the current frame if it is determined that the report point coordinates in the current frame and the report point coordinates in a first frame that are in the input information meet the preset condition comprises:

if it is determined that a flicking distance between the report point coordinates in the previous frame and the report point coordinates in the current frame meets the preset condition, the processor uses the report point coordinates in the previous frame as the report point coordinates in the current frame, wherein the flicking distance is obtained by subtracting an unintentional flicking distance from a distance between the report point coordinates in the previous frame and the report point coordinates in the current frame, and the unintentional flicking distance is a sum of all unintentional flicking distances from the previous frame to the current frame.

17. The terminal according to claim 16, wherein when the flicking distance between the report point coordinates in the previous frame and the report point coordinates in the current frame is less than a preset threshold, and a report point is in a tapped state, the report point coordinates in the previous frame are used as the report point coordinates in the current frame.

18. A terminal comprising: a memory, a processor, and a computer program that is stored in the memory and that can be executed on the processor such that the terminal is configured to implement at least the following steps:

obtaining input information, wherein the input information comprises a capacitance signal and report point coordinates that are generated based on a user operation on a terminal screen; and using report point coordinates in a previous frame as report point coordinates in a current frame if it is determined that a capacitance signal in the current frame and a capacitance signal in the previous frame that an in the input information meet a preset condition; or using report point coordinates in a previous frame as report point coordinates in a current frame if it is determined that the poor point coordinates in the current frame and the report point coordinates in the previous frame that are in the input information meet another preset condition;

wherein that the processor uses report point coordinates in the previous frame as report point coordinates in the current frame if it is determined that a capacitance signal in the current frame and a capacitance signal in the previous frame that are in the input information meet the preset condition comprises:

if it is determined that a first capacitance signal change value, a second capacitance signal change value, and movement efficiency meet the preset condition, the processor uses the report point coordinates in the previous frame as the report point coordinates in the current frame; or if it is determined that the first capacitance signal change value, the second capacitance signal change value, the movement efficiency, and a ratio meet the preset condition, the processor uses the report point coordinates in the previous frame as the report point coordinates in the current frame, wherein the first capacitance signal change value is a change value of the capacitance signal in the current frame relative to the capacitance signal in the previous frame in a movement direction of a gravity center of a capacitance bright spot, the second capacitance signal change value is a change value of the capacitance signal in the current frame relative to the capacitance signal in the previous frame in a direction opposite to the movement direction of the gravity center of the capacitance bright spot, a third capacitance change value is an overall capacitance signal change value used for movement of the gravity center of the capacitance bright spot, and the ratio is a ratio of displacement of the gravity center of the capacitance bright spot to a movement distance of the gravity center of the capacitance bright spot in a specific time period.

* * * * *

UNITED STATES PATENT AND TRADEMARK OFFICE
CERTIFICATE OF CORRECTION

PATENT NO. : 11,216,116 B2
APPLICATION NO. : 16/755343
DATED : January 4, 2022
INVENTOR(S) : Shi et al.

It is certified that error appears in the above-identified patent and that said Letters Patent is hereby corrected as shown below:

In the Claims

Column 34, Line 17, please change:
"...it is determined that the report point coordinated in the..."
To:
--...it is determined that the report point coordinates in the...--

Column 35, Line 35, please change:
"...using report point coordinate % in a previous frame as..."
To:
--...using report point coordinates in a previous frame as...--

Column 35, Line 41, please change:
"...frame as port point coordinates in a current frame if it..."
To:
--...frame as report point coordinates in a current frame if it...--

Column 35, Line 45, please change:
"...another reset condition,..."
To:
--...another preset condition,...--

Column 36, Line 44, please change:
"...determined that a capacitance signal in the current fame..."
To:
--...determined that a capacitance signal in the current frame...--

Column 37, Line 9, please amend the paragraph as follows:
 using report point coordinates in a previous frame as report point coordinates in a current
frame if it is determined that a capacitance signal in the current frame and a capacitance signal in the Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,216,116 B2 previous frame that are in the input information meet a preset condition; or using report point coordinates in a previous frame as report point coordinates in a current frame if it is determined that the report point coordinates in the current frame and the report point coordinates in the previous frame that are in the input information meet another preset condition;

Column 38, Line 10, please change:
"...report point coordinate: in a current frame if it is..."
To:
--...report point coordinates in a current frame if it is...--

Column 38, Lines 38 to 39, please change:
"...frame is greater than a preset threshold $dist^i_0$, and an axis change value is greater than the preset threshold $dist^i_0$, the..."
To:
--...frame is greater than a preset threshold $dist^0_i$, and an axis change value is greater than the preset threshold $dist^0_i$, the...--

Column 40, Line 2, please change:
"...that an in the input information meet a preset condition;..."
To:
--... that are in the input information meet a preset condition;...--

Column 40, Line 5, please change:
"...determined that the poor point coordinates in the current..."
To:
--... determined that the report point coordinates in the current...--